(12) United States Patent
Maeno

(10) Patent No.: US 7,735,115 B2
(45) Date of Patent: Jun. 8, 2010

(54) SYSTEM WHICH ENFORCES POLICY FOR VIRTUAL PRIVATE ORGANIZATION AND METHOD THEREOF

(75) Inventor: Yoshiharu Maeno, Tokyo (JP)

(73) Assignee: NEC Corporation, Tokyo (JP)

( * ) Notice: Subject to any disclaimer, the term of this patent is extended or adjusted under 35 U.S.C. 154(b) by 1107 days.

(21) Appl. No.: 11/037,124

(22) Filed: Jan. 19, 2005

(65) Prior Publication Data
US 2005/0160296 A1 Jul. 21, 2005

(30) Foreign Application Priority Data
Jan. 19, 2004 (JP) ............................. 2004-010622

(51) Int. Cl.
*G06F 17/00* (2006.01)
*H04L 29/06* (2006.01)
*G06F 15/16* (2006.01)
(52) U.S. Cl. ............................. 726/1; 726/27; 709/226
(58) Field of Classification Search ................. 713/153; 726/1, 27; 709/226
See application file for complete search history.

(56) References Cited

U.S. PATENT DOCUMENTS

| | | | | |
|---|---|---|---|---|
| 5,579,222 | A * | 11/1996 | Bains et al. ................. | 717/167 |
| 5,991,877 | A * | 11/1999 | Luckenbaugh ................. | 726/1 |
| 6,539,483 | B1 * | 3/2003 | Harrison et al. ................. | 726/1 |
| 6,611,863 | B1 * | 8/2003 | Banginwar ................. | 709/220 |
| 6,842,896 | B1 * | 1/2005 | Redding et al. ............. | 717/172 |
| 6,944,183 | B1 * | 9/2005 | Iyer et al. .................... | 370/466 |
| 7,032,022 | B1 * | 4/2006 | Shanumgam et al. ....... | 709/225 |
| 7,124,192 | B2 * | 10/2006 | High et al. .................. | 709/229 |
| 7,350,226 | B2 * | 3/2008 | Moriconi et al. ............... | 726/1 |
| 2003/0084168 | A1 * | 5/2003 | Erickson et al. ............. | 709/229 |
| 2003/0126464 | A1 * | 7/2003 | McDaniel et al. ........... | 713/201 |

FOREIGN PATENT DOCUMENTS

| | | |
|---|---|---|
| JP | 2001-043162 A | 2/2001 |
| JP | 2001-168913 A | 6/2001 |
| JP | 2002-261839 A | 9/2002 |
| JP | 2003-502757 A | 1/2003 |
| WO | WO 00/78004 A2 | 12/2000 |

OTHER PUBLICATIONS

K. Oguma et al., "A study of the application of policy computing architecture to inter-organization information exchange" Technical Research Report of the Institute of Electronics, Information and Communication Engineers, Jul. 18, 2000, pp. 195-202, vol. 100, No. 213, Institute of Electronics, Information and Communication Engineers, Japan.

(Continued)

*Primary Examiner*—Christian Laforgia
(74) *Attorney, Agent, or Firm*—Sughrue Mion PLLC

(57) ABSTRACT

System formed of a group of management entities including an enforcement environment of a policy description program, and service, data, software and hardware, in which the enforcement environment of the policy description program correlates resources to be managed (group) with a management entity which is to enforce a policy and includes a dynamic conversion unit, an enforcement unit, a unit of an interface between the management entities and a unit of an interface to the resources to be managed (group).

29 Claims, 17 Drawing Sheets

OTHER PUBLICATIONS

K. Oguma et al., "A study of the application of policy computing architecture to inter-organization information exchange" Technical Research Report of the Information Processing Society of Japan, Jul. 25, 2000, pp. 195-202, vol. 2000, No. 68, Information Processing Society of Japan, Japan.

S. Hanzawa, "The real value of policy networks" Nikkei Communications, Jul. 19, 1999, pp. 69-84, No. 298, Nikkei BP, Japan.

Y. Kanada, "Trends in policy management technology centered on IETF standardization" Transactions of the 2002 General Conference of the Institute of Electronics, Information and Communication Engineers, Mar. 7, 2002, pp. 793-794, Communication 2, Japan.

* cited by examiner

SYSTEM WHICH ENFORCES POLICY FOR VIRTUAL PRIVATE ORGANIZATION AND METHOD THEREOF

BACKGROUNDS OF THE INVENTION

1. Field of the Invention

The present invention relates to a system which automatizes construction, maintenance, updating and destruction procedures of a virtual private organization that delivers services and information on the Internet to enforce a policy for a management entity which is an abstraction of service, data, software and hardware forming the virtual private organization and, more particular, a system of enforcing a policy for a virtual private organization which system enables automation of a maintenance procedure by failure recovery and an updating procedure at the time of scale expansion, and a method therefore.

2. Description of the Related Art

Conventional systems of enforcing a policy for a management entity which is obtained by abstracting service, data, software and hardware forming a virtual private organization is disclosed in, for example, Japanese Patent Laying-Open (Kokai) No. 2001-43162 (Literature 1), Japanese Patent Laying-Open (Kokai) No. 2001-168913 (Literature 2) and Japanese Translation of PCT International Application No. 2003-502757 (Literature 3).

In the following, one example of these conventional policy enforcing systems will be described with reference to FIG. 17.

With reference to FIG. 17, a conventional policy enforcing system is formed of three data bases, a policy data base 1700, a user information data base 1701 and a management information data base 1702, a classification unit 1704 and a plurality of managing layers or devices to be managed (group). A system which enforces a policy in a communication network is formed of a service managing layer 1801, a network managing layer 1802 and an element managing layer 1803. The plurality of the managing layers or the devices to be managed (group) include conversion units 1705 to 1707, storage units 1708 to 1710, determination units 1711 to 1713 and devices to be managed 1714 to 1719, respectively.

Here, the service managing layer 1801 manages, with respect to an application (software) executed on the devices 1714 and 1715 to be managed, what kind of application is installed and executed on which device or the like. The network managing layer 1802 conducts management related to a network of the devices 1716 and 1717 including a router, a switch, etc. to be managed. The element managing layer 1803 conducts management related to the devices 1718 and 1719 including a PC, an HDD, a printer, etc. to be managed.

Thus structured conventional policy enforcing system operates in the following manner.

More specifically, the classification unit 1704 classifies individual policies accumulated in the policy data base 1700 into layers in which the policies are enforced or into devices to be managed (group). The conversion units 1705 to 1707 of the respective managing layers or the devices to be managed (group) convert description of conditions and instructions of the classified policies into a format (command) inherent to the device to be managed (group). At this time, user's identifier and authorization in the user information data base 1701 and static structure information of the system (version information of each device or software etc.) in the management information data base 1702 are referred to and used for the conversion. The storage units 1708 to 1710 accumulate the converted policies. The determination unit 1711 to 1713 determines from description of the conditions of a policy whether the policy can be enforced and when determining that it is enforceable, operates the device 1714-1719 based on the description of an instruction of the policy to enforce the policy for the device.

The above-described conventional system which enforces a policy for management entities forming a virtual private organization has the following problems.

First problem is that efficient operation is impossible when the number of devices included in each managing layer for service management, network management and element management or in devices to be managed (group) is increased. In other words, in the management of a large-scale virtual private organization having a large number of devices, efficient operation is difficult. The reason is that the more the number of devices is increased, the larger the load on processing in a determination unit becomes to be a bottleneck, resulting in requiring more time in determination and enforcement of a policy.

Second problem is difficulty in coping with change of the number of devices to be managed or a device structure and addition of a new kind of device or operation. The reason is that because the policies are classified into three layers in advance and then managed, when a new kind of device or operation is added to change a policy, updates of a storage unit will be frequently made.

Third problem is that it is impossible to enforce a high-level policy for a plurality of devices bridging over the respective managing layers or devices to be managed (group). The reason is that because the system employs a method of classifying the policies into fixed managing layers or devices to be managed (group), the system is incapable of coping with a policy which requires communication or information exchange between determination units of the respective managing layers or the devices to be managed (group).

SUMMARY OF THE INVENTION

First object of the present invention is to provide a system of enforcing a policy for a virtual private organization which system enables efficient operation even for a large-scale virtual private organization having a large number of devices, and a method thereof.

Second object of the present invention is to provide a system of enforcing a policy for a virtual private organization which system has excellent flexibility and expandability of smoothly coping with change in the number of devices or a device structure and addition of a new kind of device or operation, and a method thereof.

Third object of the present invention is to provide a system of enforcing a policy for a virtual private organization which is capable of enforcing a high-level policy for a plurality of devices bridging over the respective managing layers or devices to be managed (group) and a method thereof.

According to the first aspect of the invention, in a system which enforces a policy for a virtual private organization formed of a plurality of management entities including a policy enforcement environment and resources to be managed, a management console which manages the management entities distributes a policy description program to the management entity, and the management entity correlates an access to information of a class in the policy description program with an information request to the resources to be managed or other the management entity and correlates operation to a class in the policy description program with an enforcement request to the resources to be managed or other the management entity.

In the preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, and a normalization unit which inputs and outputs an information request and an enforcement request in a form inherent to the resources to be managed which the management entity includes.

In another preferred construction, the resources to be managed include computer hardware which stores data for providing application service and executes computer software.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, and a normalization unit which inputs and outputs an information request and an enforcement request in a form inherent to the resources to be managed which the management entity includes, wherein the resources to be managed including computer hardware which stores data for providing application service and executes computer software.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, a normalization unit which inputs and outputs an information request and an enforcement request in a form inherent to the resources to be managed which the management entity includes, and an information cache unit which stores the input/output information request and enforcement request.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, a normalization unit which inputs and outputs an information request and an enforcement request in a form inherent to the resources to be managed which the management entity includes, and an information cache unit which stores the input/output information request and enforcement request, wherein the resources to be managed including computer hardware which stores data for providing application service and executes computer software.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, a normalization unit which inputs and outputs an information request and an enforcement request in a form inherent to the resources to be managed which the management entity includes, an information cache unit which stores the input/output information request and enforcement request, and a request reception unit which determines whether the enforcement request to the management entity to which the policy enforcement environment belongs exists or not.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, a normalization unit which inputs and outputs an information request and an enforcement request in a form inherent to the resources to be managed which the management entity includes, an information cache unit which stores the input/output information request and enforcement request, and a request reception unit which determines whether the enforcement request to the management entity to which the policy enforcement environment belongs exists or not, wherein the request reception unit determining whether the enforcement request to the management entity to which the policy enforcement environment belongs exists or not and when there exists an enforcement request to the management entity to which the policy enforcement environment belongs, extracting a kind and a parameter of the request to store, in the information cache unit, the obtained request in one kind of form of an information request from the information request unit.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, and a normalization unit which inputs and outputs an information request and an enforcement request in a form inherent to the resources to be managed which the management entity includes, wherein the dynamic conversion unit providing the policy description program with an enforcement environment class having a method of searching for a management entity as a class library.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, and a normalization unit which inputs and outputs an information request and an enforcement request in a form inherent to the resources to be managed which the management entity includes, wherein the dynamic conversion unit providing the policy description program with an enforcement environment class, as a class library, having a method of searching for a management entity in which a policy enforcement environment of the class is included.

In another preferred construction, the policy enforcement environment of the management entity includes a dynamic conversion unit which correlates an access to information of a class in the policy description program with an information request to the resources to be managed or other the management entity, an enforcement unit which correlates operation to a class in the policy description program with an enforcement request to the resources to be managed or other the management entity, an information request unit which inputs and outputs an information request to/from other the management entities, an enforcement request unit which inputs and outputs an enforcement request to/from other management entities, and a normalization unit which inputs and outputs an information request and an enforcement request in a form inherent to the resources to be managed which the management entity includes, wherein the dynamic conversion unit providing the policy description program with an enforcement environment class, as a class library, having a method of searching for a method of a class corresponding to an enforcement request received by a management entity in which a policy enforcement environment of the class is included.

In another preferred construction, the management console includes a management information data base which stores static structure information of the system, a user information data base which stores user information of the management entity, and a conversion unit which refers to the management information data base and the user information data base to convert description of the policy description program into a form inherent to the resources to be managed of the management entity.

In another preferred construction, the management entity is a content management entity which stores content and the virtual private organization manages content.

In another preferred construction, the management entity includes a content management entity which stores content and the virtual private organization manages content, and the management entity includes a directory management entity which stores, as an index, a name of content which each the content management entity stores.

According to the second aspect of the invention, a method of enforcing a policy for a virtual private organization formed of a plurality of management entities including a policy enforcement environment and resources to be managed, comprising the steps of distributing a policy description program from a management console which manages the management entities to the management entity, in the management entity, correlating an access to information of a class in the policy description program with an information request to the resources to be managed or other the management entity, and correlating operation to a class in the policy description program with an enforcement request to the resources to be managed or other the management entity.

In the preferred construction, the method of enforcing a policy for a virtual private organization comprises, in the policy enforcement environment of the management entity, a dynamic conversion step of correlating an access to information of a class in the policy description program with an information request to the resources to be managed or other the management entity, an enforcement step of correlating operation to a class in the policy description program with an enforcement request to the resources to be managed or other the management entity, a step of inputting and outputting an information request to/from other the management entities, a step of inputting and outputting an enforcement request to/from other management entities, and a step of inputting and outputting an information request and an enforcement request in a form inherent to the resources to be managed which the management entity includes.

In another preferred construction, the resources to be managed include computer hardware which stores data for providing application service and executes computer software.

In another preferred construction, the method of enforcing a policy for a virtual private organization comprises, in the policy enforcement environment of the management entity, a dynamic conversion step of correlating an access to information of a class in the policy description program with an information request to the resources to be managed or other the management entity, an enforcement step of correlating operation to a class in the policy description program with an enforcement request to the resources to be managed or other the management entity, a step of inputting and outputting an information request to/from other the management entities, a step of inputting and outputting an enforcement request to/from other management entities, a step of inputting and outputting an information request and an enforcement request in a form inherent to the resources to be managed which the management entity includes, and a step of storing the input/output information request and enforcement request.

In another preferred construction, the method of enforcing a policy for a virtual private organization comprises, in the policy enforcement environment of the management entity, a dynamic conversion step of correlating an access to information of a class in the policy description program with an information request to the resources to be managed or other the management entity, an enforcement step of correlating operation to a class in the policy description program with an enforcement request to the resources to be managed or other the management entity, a step of inputting and outputting an information request to/from other the management entities, a step of inputting and outputting an enforcement request to/from other management entities, a step of inputting and outputting an information request and an enforcement request in a form inherent to the resources to be managed which the management entity includes, a step of storing the input/output information request and enforcement request, and a step of determining whether the enforcement request to the management entity to which the policy enforcement environment belongs exists or not.

In another preferred construction, the method of enforcing a policy for a virtual private organization comprises, in the policy enforcement environment of the management entity, a dynamic conversion step of correlating an access to information of a class in the policy description program with an information request to the resources to be managed or other the management entity, an enforcement step of correlating operation to a class in the policy description program with an enforcement request to the resources to be managed or other the management entity, a step of inputting and outputting an information request to/from other the management entities, a step of inputting and outputting an enforcement request to/from other management entities, a step of inputting and outputting an information request and an enforcement request in a form inherent to the resources to be managed which the management entity includes, a step of storing the input/output information request and enforcement request, and a step of determining whether the enforcement request to the management entity to which the policy enforcement environment belongs exists or not, and when there exists an enforcement request to the management entity to which the policy enforcement environment belongs, extracting a kind and a parameter of the request to store the obtained request in one kind of form of an information request from the information request unit.

In another preferred construction, the method of enforcing a policy for a virtual private organization comprises, in the policy enforcement environment of the management entity, a dynamic conversion step of correlating an access to information of a class in the policy description program with an information request to the resources to be managed or other the management entity, an enforcement step of correlating operation to a class in the policy description program with an enforcement request to the resources to be managed or other the management entity, a step of inputting and outputting an information request to/from other the management entities, a step of inputting and outputting an enforcement request to/from other management entities, and a step of inputting and outputting an information request and an enforcement request in a form inherent to the resources to be managed which the management entity includes, wherein the dynamic conversion step providing the policy description program with an enforcement environment class having a method of searching for a management entity as a class library.

In another preferred construction, the method of enforcing a policy for a virtual private organization comprises, in the policy enforcement environment of the management entity, a dynamic conversion step of correlating an access to information of a class in the policy description program with an information request to the resources to be managed or other the management entity, an enforcement step of correlating operation to a class in the policy description program with an enforcement request to the resources to be managed or other the management entity, a step of inputting/outputting an information request to/form other the management entities, a step of inputting and outputting an enforcement request to/from other management entities, and a step of inputting and outputting an information request and an enforcement request in a form inherent to the resources to be managed which the management entity includes, wherein the dynamic conversion step providing the policy description program with an enforcement environment class, as a class library, having a method of searching for a management entity in which a policy enforcement environment of the class is included.

In another preferred construction, the method of enforcing a policy for a virtual private organization comprises, in the policy enforcement environment of the management entity, a dynamic conversion step of correlating an access to information of a class in the policy description program with an information request to the resources to be managed or other the management entity, an enforcement step of correlating operation to a class in the policy description program with an enforcement request to the resources to be managed or other the management entity, a step of inputting/outputting an information request to/from other the management entities, a step of inputting and outputting an enforcement request to/from other management entities, and a step of inputting and outputting an information request and an enforcement request in a form inherent to the resources to be managed which the management entity includes, wherein the dynamic conversion step providing the policy description program with an enforcement environment class, as a class library, having a method of searching for a method of a class corresponding to an enforcement request received by a management entity in which a policy enforcement environment of the class is included.

In another preferred construction, the method of enforcing a policy for a virtual private organization comprises, in the management console, a step of referring to a management information data base which stores static structure information of the system and a user information data base which stores user information of the management entity, and converting description of the policy description program into a form inherent to the resources to be managed of the management entity.

In another preferred construction, the management entity includes a content management entity which stores content and the virtual private organization manages content.

In another preferred construction, the management entity includes a content management entity which stores content and the virtual private organization manages content, and the management entity includes a directory management entity which stores, as an index, a name of content which each the content management entity stores.

According to another aspect of the invention, a program which conducts policy enforcement for a virtual private organization formed of a plurality of management entities including a policy enforcement environment and resources to be managed, comprises the functions of distributing a policy description program from a management console which manages the management entities to the management entity, correlating an access to information of a class in the policy description program with an information request to the resources to be managed or other the management entity by the management entity, and correlating operation to a class in the policy description program with an enforcement request to the resources to be managed or other the management entity.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

First Embodiment

Figure 1:
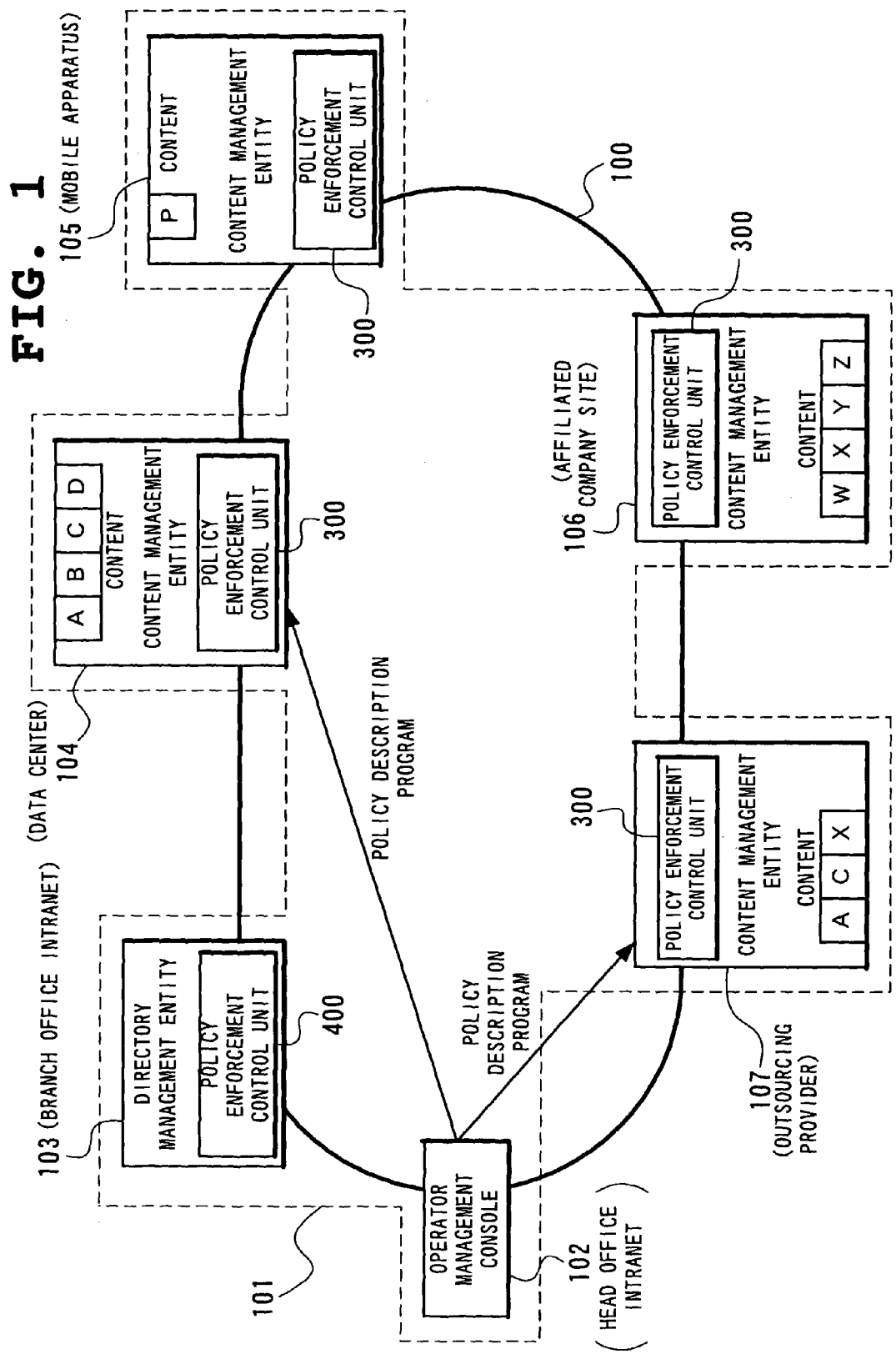
FIG. 1 is a block diagram of a virtual private organization that provides content distribution with each other, which shows a structure of a policy enforcing system according to a first embodiment of the present invention.

With reference to FIG. 1, a policy enforcing system according to a first embodiment of the present invention includes an operator management console 102, a directory management entity 103 and content management entities 104 to 107 in a virtual private organization 101 set up on an internet 100 to provide content distribution with each other.

Figure 2:
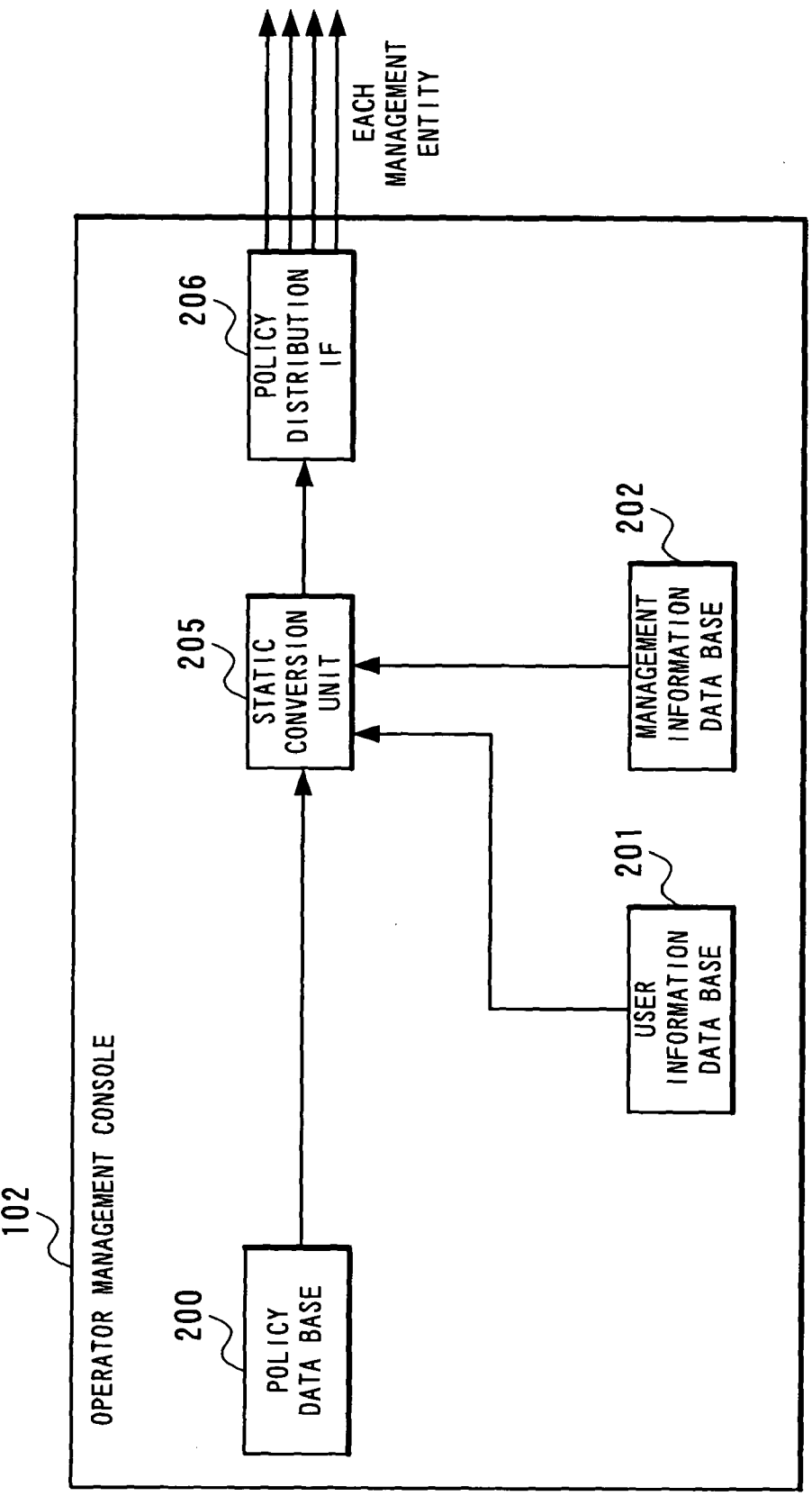
FIG. 2 is a block diagram showing a structure of a management console of the policy enforcing system according to the first embodiment of the present invention.

With reference to FIG. 2, the operator management console 102 is formed of three data bases, a policy data base 200, a user information data base 201 and a management information data base 202, a static conversion unit 205 and a policy distribution interface (IF) 206.

Figure 3:
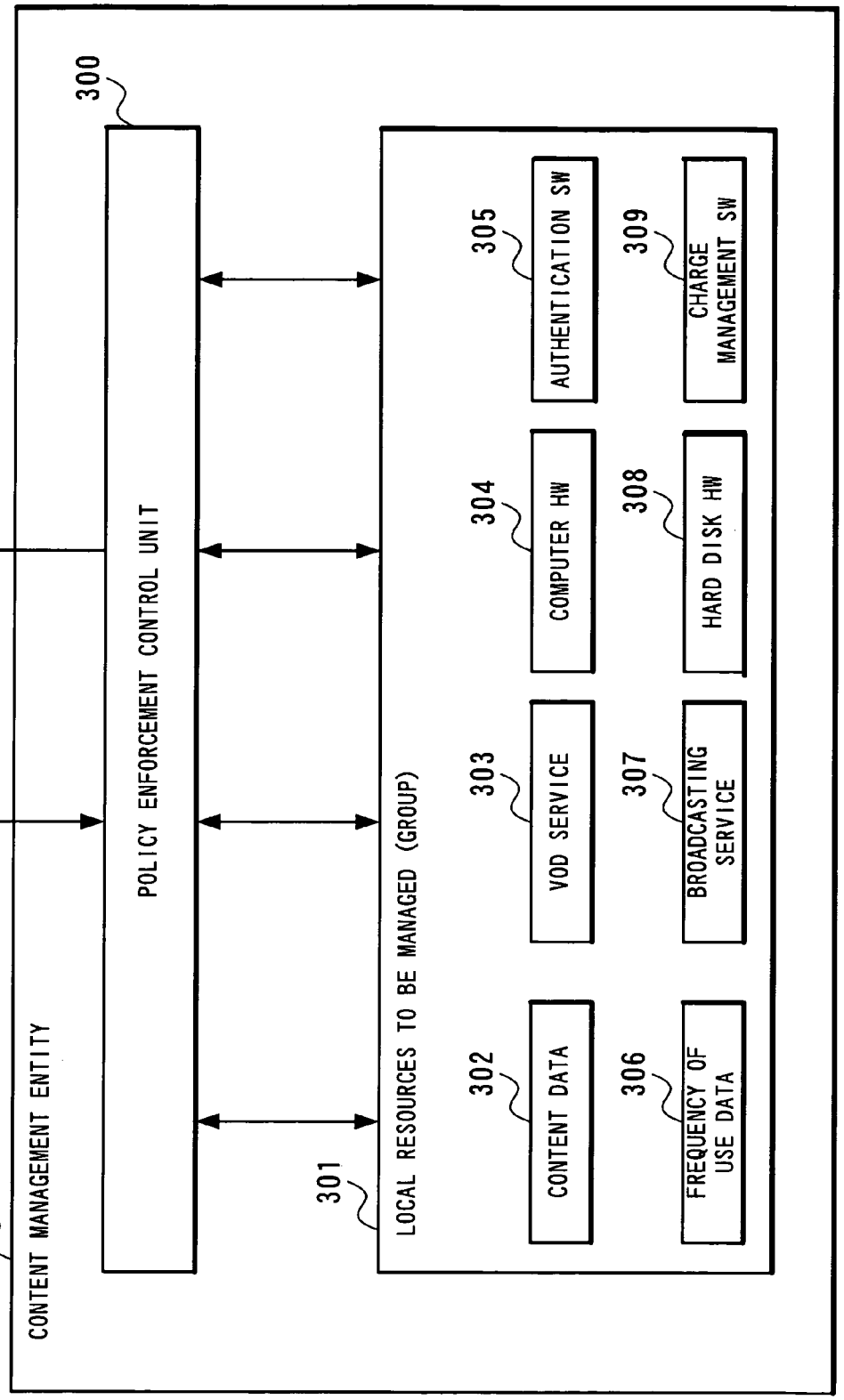
FIG. 3 is a block diagram showing a structure of a content management entity of the policy enforcing system according to the first embodiment of the present invention.

With reference to FIG. 3, the content management entities 104 to 107 are each formed of a policy enforcement control unit (policy enforcement environment) 300 and resources to be managed (group) 301.

The resources to be managed (group) 301 include hardware (computer HW 304, hard disk HW 308) which executes software (authentication SW 305, charge management SW 309) for managing information (content data 302, frequency of use data 306) and services (VOD service 303, broadcasting service 307).

The frequency of use data 306 is information indicative of a history of content use. The VOD (video on demand) service 303 is service of distributing content in response to a request. The broadcasting service 307 is service of distributing content to unspecified user. The authentication SW 305 is software for identifying a user of content to determine whether the user is authorized to use the content. The charge management SW 309 is software for adding up charge amounts according to the amount of content use.

Figure 4:
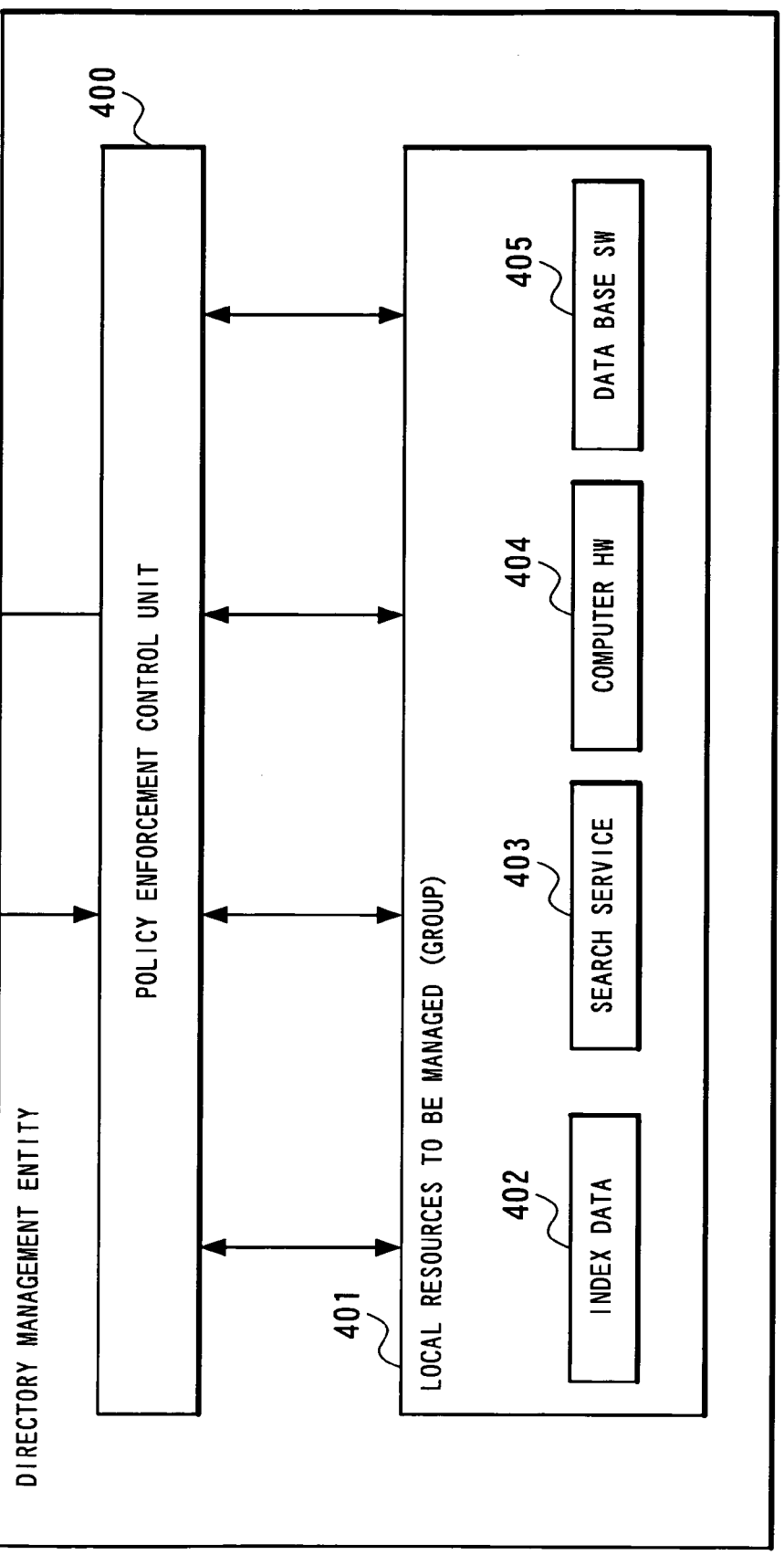
FIG. 4 is a block diagram showing a structure of a directory management entity of the policy enforcing system according to the first embodiment of the present invention.

With reference to FIG. 4, the directory management entity 103 is formed of a policy enforcement control unit (policy enforcement environment) 400 and resources to be managed (group) 401. The resources to be managed (group) 401 include computer hardware (computer HW404) which executes software (data base SW 405) for managing information (index data 402) and service (search service 403) as shown in FIG. 4. The index data 402 is a list of index information such as a name, an author, date of generation of content, etc. The search service 403 is service for searching for a name, an author, date of generation of content, etc.

Figure 5:
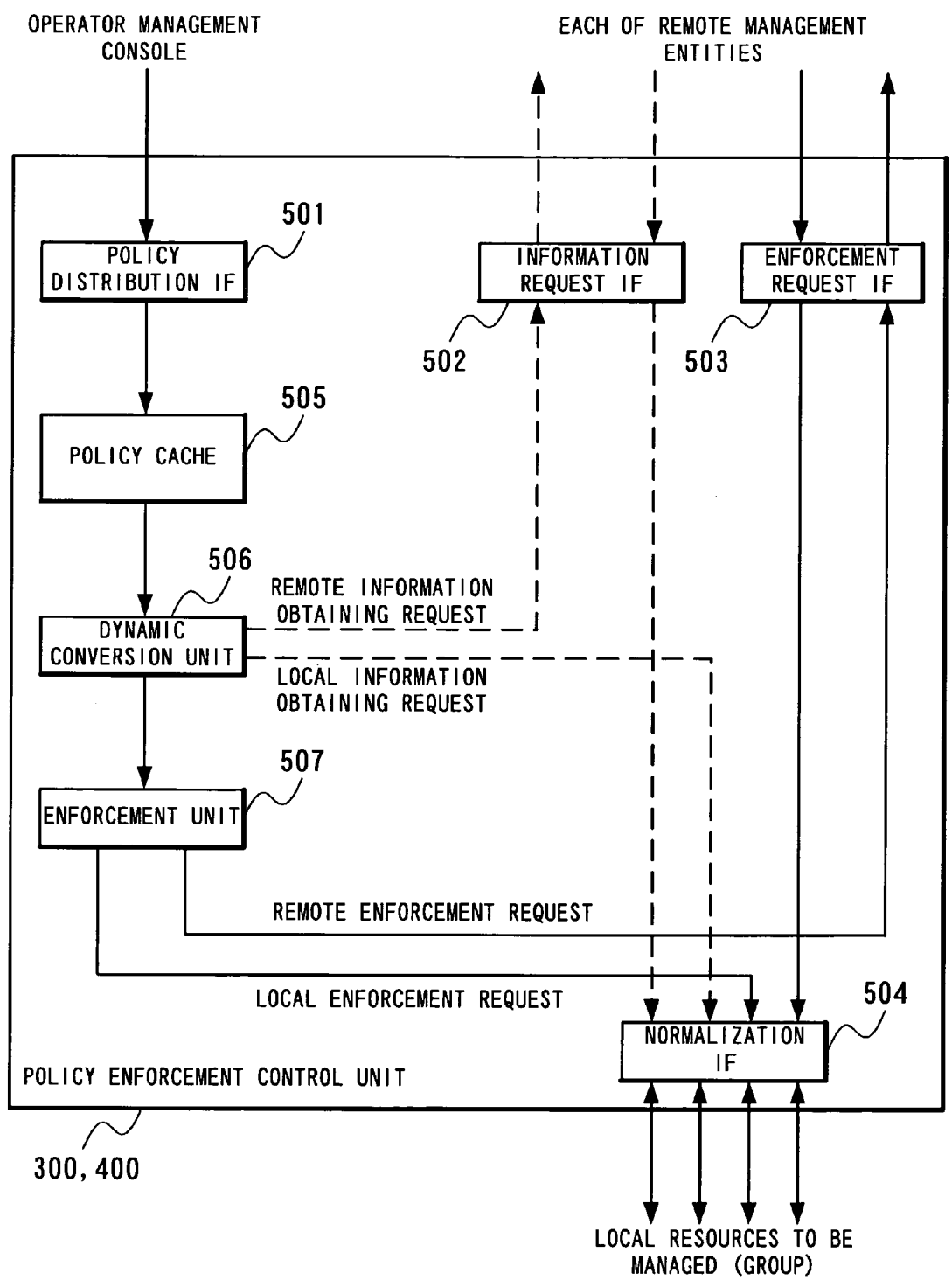
FIG. 5 is a block diagram showing a structure of a policy enforcement control unit of the policy enforcing system according to the first embodiment of the present invention.

With reference to FIG. 5, the policy enforcement control units (policy enforcement environments) 300 and 400 each include a policy distribution IF (interface) 501, an information request IF (interface) 502, an enforcement request IF (interface) 503, a normalization IF (interface) 504, a policy cache 505, a dynamic conversion unit 506 and an enforcement unit 507.

Figure 6:
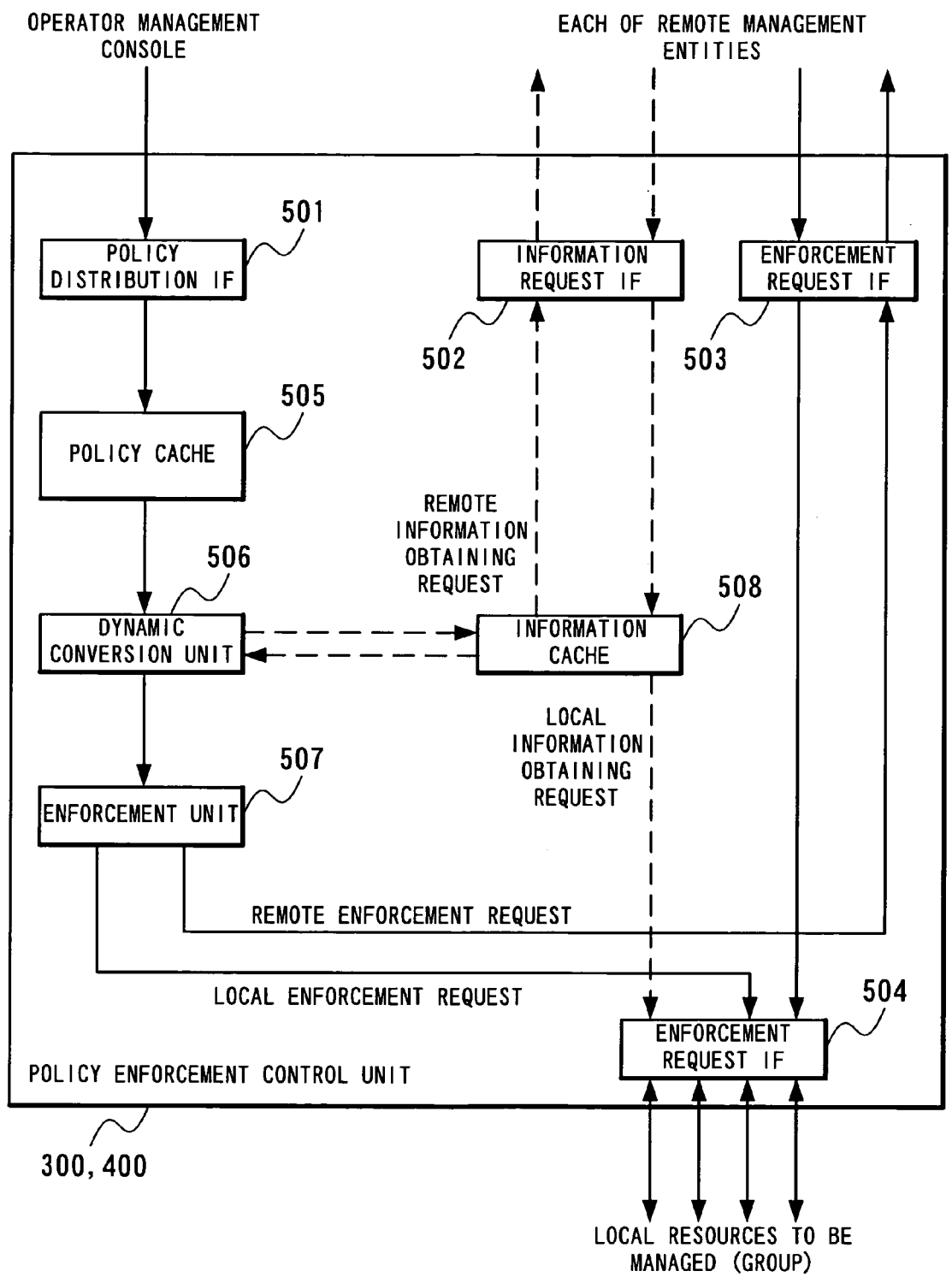
FIG. 6 is a block diagram showing a structure of a policy enforcement control unit having an information cache in the policy enforcing system according to the first embodiment of the present invention.

FIG. 6 shows other example of a structure of the policy enforcement control units (policy enforcement environments) 300 and 400, which in addition to the structure illustrated in FIG. 5, includes an information cache 508. Thus, it is possible to have a cache for holding information for a fixed period. Period for holding information in a cache varies with the information. For example, with respect to information whose request is frequently made and which is updated by advertising, subscribing, or publishing which will be described later, the holding period will be shortened.

Figure 7:
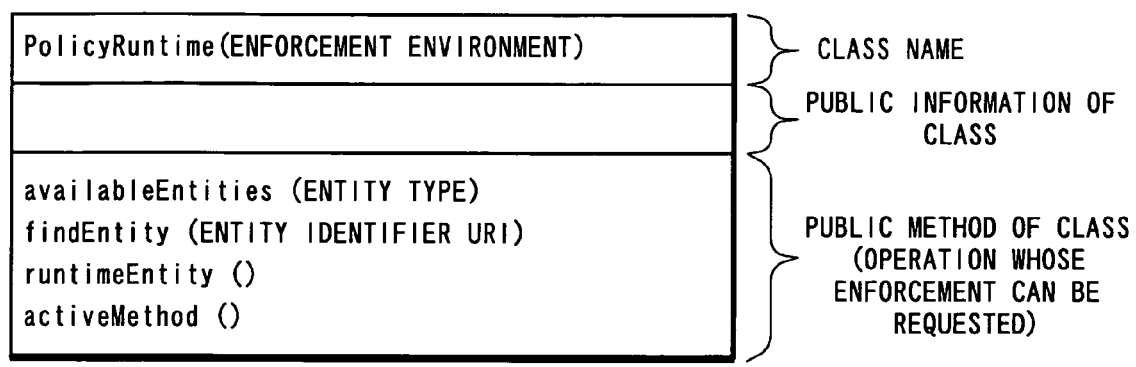
FIG. 7 is a diagram showing an example of a class of an enforcement environment class according to the first embodiment of the present invention.

With reference to FIG. 7, shown is an enforcement environment class as a class on an object-oriented program which can be used on a policy description program converted by the dynamic conversion unit 506 and enforced. Manner of description shown in FIG. 7 is based on rules of a class diagram in UML (universal modeling language). The enforcement environment class can be used as a library at the time of program enforcement, in which the dynamic conversion unit 506 and the enforcement unit 507 make an access to public information of the class and public method activation operation correspond to operation of issuing requests to the information request IF 502 and the enforcement request IF 503 of an appropriate management entity.

In the enforcement environment class, defined as operation whose enforcement can be requested are public methods of finding a management entity from a management entity type (availableEntities), finding a management entity from an identifier (findEntity), finding a management entity including its own enforcement environment (runtimeEntity) and finding a method in which an information request or an enforcement request is accepted by a management entity (activeMethod), which can be used as a library of the dynamic conversion unit 506 in the policy description program.

Figure 8:
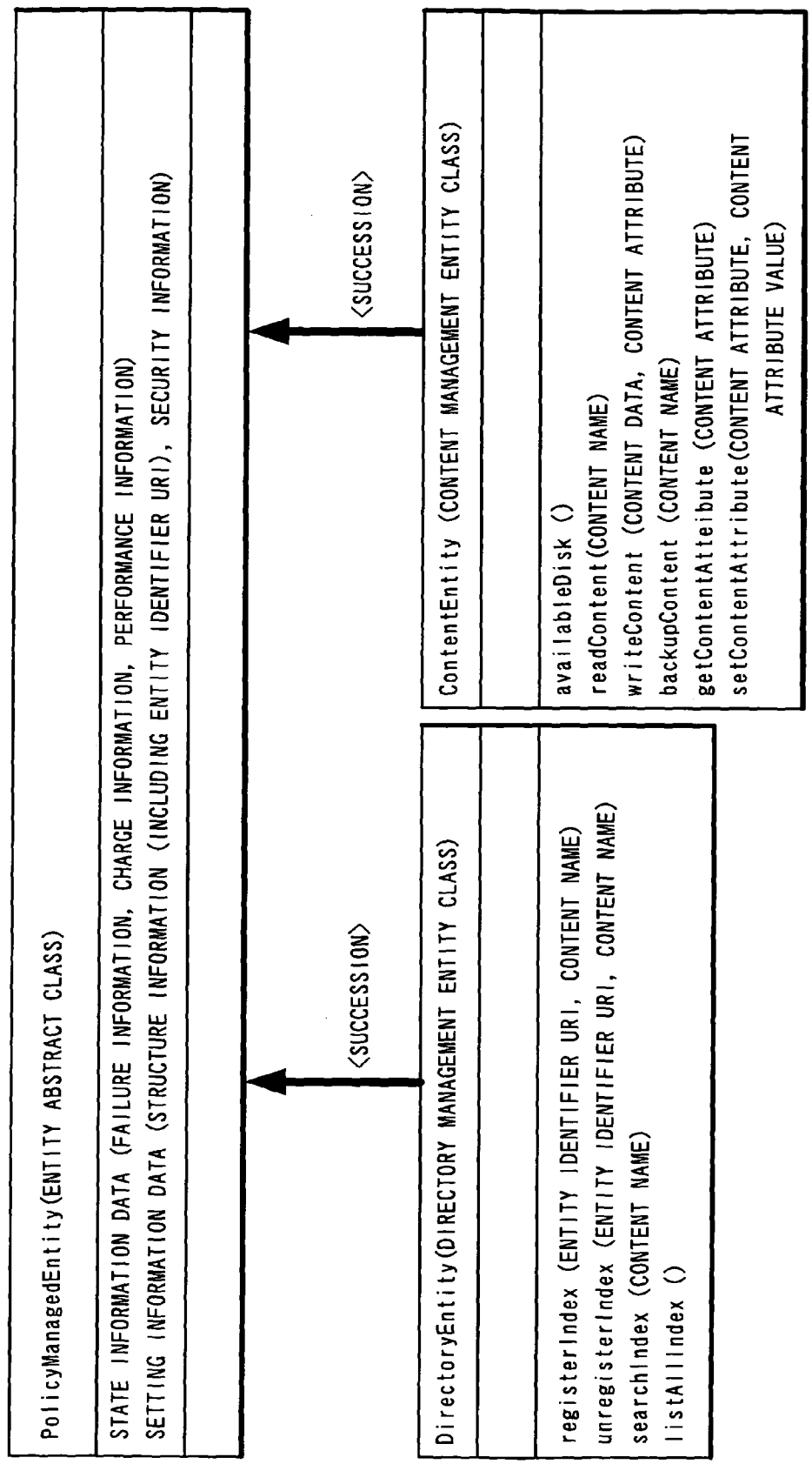
FIG. 8 is a diagram showing an example of a class of a directory management entity class and a content management entity class according to the first embodiment of the present invention.

With reference to FIG. 8, shown are a directory management entity class and a content management entity class as a class on an object-oriented program which can be used by the policy description program converted by the dynamic conversion unit 506 and enforced. Description manner illustrated in FIG. 8 is based on the rules of a class diagram in UML. The class can be used as a library at the time of program enforcement, and the dynamic conversion unit 506 and the enforcement unit 507 correlate an access to public information of the class and public method activation operation with operation of issuing requests to the information request IF 502 and the enforcement request IF 503 of an appropriate management entity. Every management entity is defined inheriting an entity abstract class. Both of the directory management entity class and the content management entity class inherit state information data and setting information data defined by the entity abstract class.

As operation whose enforcement can be requested, defined in the directory management entity class are public methods of registering (registerIndex), deleting (unregisterIndex) and searching (searchIndex) a content name, and generating a list of content names (listAllIndex), which can be used as a library of the dynamic conversion unit 506 in the policy description program.

As operation whose enforcement can be requested, defined in the content management entity class are public methods of searching for a free capacity (availableDisk), reading (readContent) and writing (writeContent) content, copying content to back up the same (backupContent), and reading (getContentAttribute) and writing (setContentAttribute) attribute information of content, which can be used as a library of the dynamic conversion unit 506 in the policy description program.

Each of these units operates in the following manner.

The virtual private organization 101 is a dedicated virtual information communication infrastructure set up by using resources owned by an operator itself which is an individual or a company and resources leased by a data center, an outsourcing provider, etc. The resources include services, data, software and hardware. Virtual private network is a special example of the virtual private organization. With consistent behavior defined by a group of policy description programs set by an operator and a user, the virtual private organization 101 is an automatized autonomous information communication infrastructure.

In the present embodiment, the virtual private organization 101, as a corporate information system, distributes content to employees of a company as users and provides content between management entities. The content include corporate personnel• accounts data, moving images for employee education, and HTML (hyper text markup language) format home pages in which technical specifications of products are recited. The content can be arbitrary digital data.

The virtual private organization 101 is an aggregate of management entities which can communicate with each other on the internet, which is managed by an operator from the operator management console 102 to stably operate the entire virtual private organization. The management entities may exist on an intranet such as a LAN (local area network) or an extranet such as an inter-company dedicated line in some cases. The management entity (the directory management entity 103, the content management entities 104 to 107) is the concept obtained by abstracting into one a group of resources such as services, data, software and hardware to be managed which form the virtual private organization and software and hardware mounted with a common policy enforcement control unit (policy enforcement environment) for management.

By distributing a policy description program from the operator management console 102 to the management entity (the directory management entity 103, the content management entities 104 to 107), an operator can define behavior of the management entity. Shown in the present embodiment is an example in which the operator management console 102 is disposed in the head office intranet. More specifically, from the head office intranet, behavior of all the management entities on the virtual private organization including leased resources is defined and automatized by the policy description program group.

Resources to be managed (group) which are contained in the management entity (the directory management entity 103, the content management entities 104 to 107) may be intra-company services or data owned by an operator or may be software or hardware leased by an outsourcing provider in some cases. The resource may be in another case a mobile apparatus used by an employee belonging to the same company as that of the operator when making a remote access. In other words, the resources include not only a computer but also a mobile apparatus such as a personal digital assistance (PDA) or an internet-applicable portable phone. The content management entities 104 to 107 are management entities including software and hardware which store various content, as well as providing or requesting content. A part of the content management entities stores a copy of content as a back-up. In addition, a content management entity which stores a copy of content for distributing loads is also useful.

Shown in the present embodiment is an example where resources to be managed of the content management entity 104 are resources leased from a data center, the resources to be managed of the content management entity 105 are employee's mobile apparatus, resources to be managed of the content management entity 106 are common resources supplied by an affiliated company site and resources to be managed of the content management entity 107 are resources leased from an outsourcing provider.

The directory management entity 103 is a management entity including software and hardware which stores index information such as a name, an author, date of making of each content stored by the content management entities 104 to 107. The directory management entity 103 provides index information to support content search. Shown in the present embodiment is a case where the directory management entity 103 is disposed in the branch office intranet.

Stored in the policy data base 200 of the operator management console 102 is a policy description program of an operator or a user of the virtual private organization 101. Stored in the user information data base 201 are user's identifier and authorization. Stored in the management information data base 202 are static structure information of the virtual private organization such as an address of the operator management console 102, addresses of the management entities 103 to 107, a policy description program supported by the management entity and version information of communication software for distributing a policy description program.

The static conversion unit 205 converts description content and a format of a policy description program into a format inherent to a policy description program supported by the policy enforcement control unit (enforcement environment) of the management entity. The policy description program can be described, for example, in an object-oriented high-level program language such as Java (R) or C++. The static conversion unit 205 is a compiler which converts a high-level program language into a low-level program language such as a byte code or a binary code. Alternatively, a policy description program described with Java (R) may be converted into a policy description program described with C++ supported by the management entity. The unit may also be a conversion unit which converts policy description approximate to a natural language into a program language supported by the management entity.

At the time of conducting conversion processing by the static conversion unit 205, the user's identifier and authorization stored in the user information data base 201 and the static structure information of the system stored in the management information data base 202 are referred to and used for conversion. For example, to a user's constant for identification which appears in a policy description program, apply a character string of an employee number which is an identifier of a user of the user information data base 201. When the user has no authorization, no conversion is made of the policy description program at the static conversion unit 205 to refuse the use.

The policy distribution IF 206 distributes a converted policy description program to the management entity (the directory management entity 103, the content management entities 104 to 107).

As will be described later, the policy description program in the present embodiment has its enforcement position not fixed at a specific management entity but be at the policy enforcement control unit (enforcement environment) of an arbitrary management entity. In other words, the need of generating a policy description program specialized for a specific management entity will be eliminated. The policy description program, however, produces more effects when enforced in a management entity which is more frequently referred to in the description of the policy description program. The static conversion unit 205 and the policy distribution IF 206 therefore determine from an attribute type of a class or a variable appearing in the policy description program whether the policy description program should be distributed to the directory management entity or to the content management entity and determine by which communication software the distribution is made.

By the software or hardware mounted with the policy enforcement control unit (policy enforcement environment) 300, 400, the distributed policy description program is enforced. As the hardware, hardware contained in the resources to be managed (group) may be used or computer hardware dedicated to policy enforcement environments may be prepared. The policy description program is distributed from the operator management console 102 to the policy distribution IF 501 of the management entity (the directory management entity 103, the content management entities 104 to 107) and stored in the policy cache 505.

The dynamic conversion unit 506 of the management entity (the directory management entity 103, the content management entities 104 to 107) replaces a class or a variable changing at the time of enforcement with obtained information to convert the policy description program. At the time of obtaining information, make a request for information to local (its own management entity) resources to be managed (group) from the dynamic conversion unit 506 through the normalization IF 504 or make a request for information to other remote management entity through the information request IF 502. Class appearing in the policy description program is correlated with the management entity. An access to public information of a class, for example, is enforced as an information request from the information request IF 502 to a remote management entity (other management entity).

In an information request for public information of a class made between management entities, used is a SOAP (simple object access protocol) message in which request content are described in the XML (extensible markup language) language to communicate the HTTP (hyper text transfer protocol) protocol. When requesting a large amount of information, the communication method is switched to a method of communicating a byte stream by the TCP (transmission control protocol) protocol. Dynamic switching is possible by using a highly efficient protocol of other lower communication layer. Determination of such switching can be made considering the amount of information requested by the dynamic conversion unit 506 and the information request IF 502 or a usable protocol group and needs to be included neither in a policy description program nor in class definition.

Among forms of an information request described in the XML language are query, advertise, and subscribe and publish. As to public information of a class which is frequently used, make subscription in advance to periodically receive publishing of information. As to information not frequently used, make query at the time of use. As to information required from numbers of management entities, a method of simultaneously distributing the information by advertising is employed. Such a manner of employing methods depending on information may be determined in consideration of an access frequency to public information of a class by the dynamic conversion unit 506 and the information request IF 502 and needs to be included neither in a policy description program nor in class definition.

The enforcement unit 507 requests enforcement of operation or setting change from local resources to be managed (group) through the normalization IF 504 or requests enforcement of operation or setting change from a remote management entity through the enforcement request IF 503. In a case of local operation or setting change, the normalization IF 504 communicates with local resources to be managed (group) by using the SNMP (simple network management protocol) protocol. Communication may be conducted by using, for each resource to be managed, one of various protocols which is supported by the resource. The normalization IF 504 converts a format of a request for operation of activating a public method of a class appearing in the policy description program into a time series of an operation format peculiar to an individual resource in a management entity correlated with the class.

In a case of remote operation or setting change, operation of activating a public method of a class is enforced as a request for enforcement from the enforcement request IF 503 to a remote management entity. In an enforcement request made between management entities, similarly to an information request for public information of a class made between management entities, an SOAP message with enforcement content described in the XML language is used to communicate the HTTP protocol. Other highly efficient protocol in a lower communication layer may be used as well and dynamically switched. Determination of such switching can be made considering a scale of enforcement content or a usable protocol group by the dynamic conversion unit 506 and the enforcement request IF 503 and needs to be included neither in a policy description program nor in class definition.

Class can be used as a library at the program enforcement, and the dynamic conversion unit 506 and the enforcement unit 507 correlate an access to public information of a class and operation of activating a public method with operation of issuing requests to the information request IF 502 and the enforcement request IF 503.

Next, detailed description will be made of entire operation of the present embodiment with reference to FIGS. 7 and 8, the policy description program shown in FIG. 9, and FIG. 10.

Figure 9:
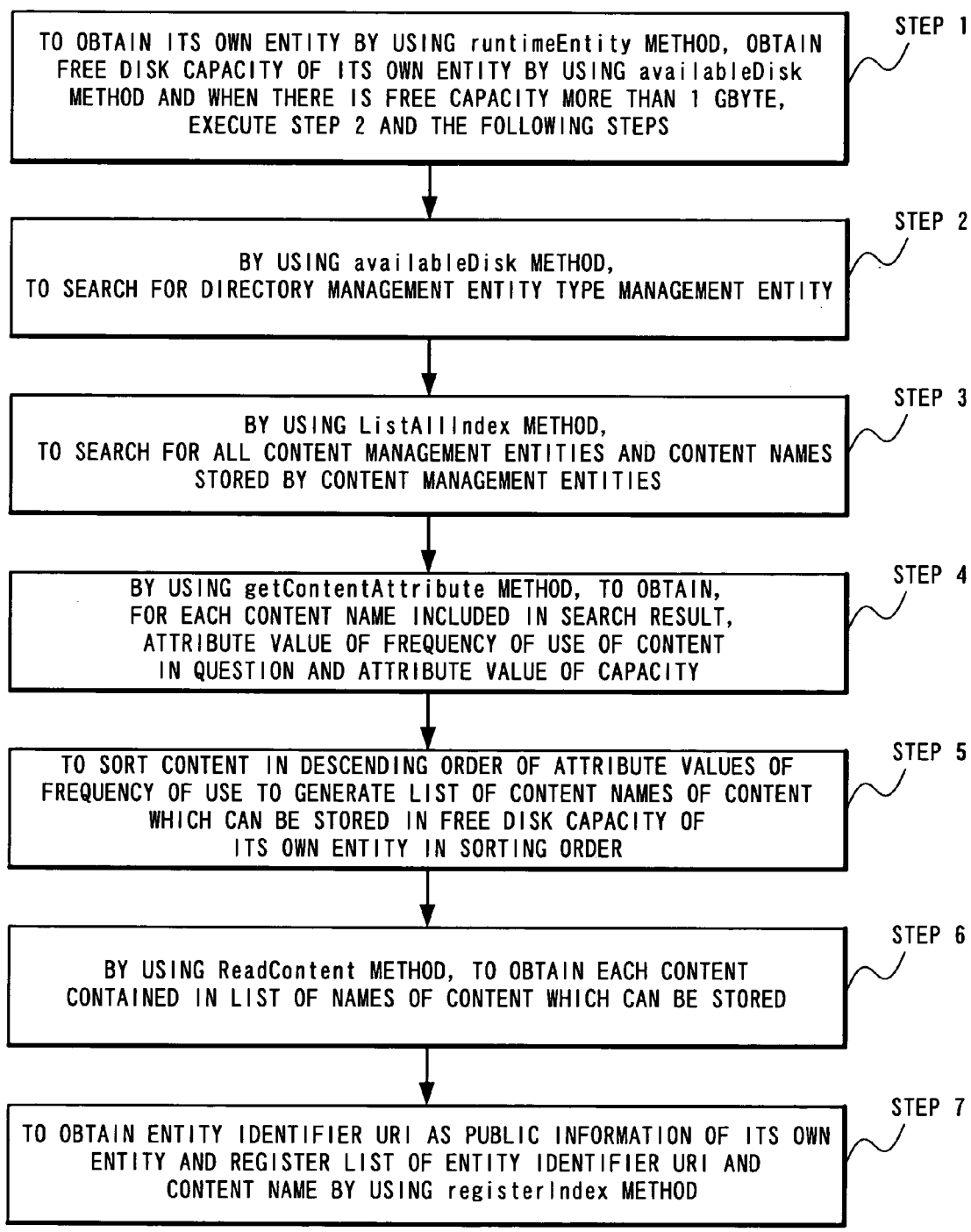
FIG. 9 is a flow chart showing operation content of a policy description program according to the first embodiment of the present invention.
Figure 10:
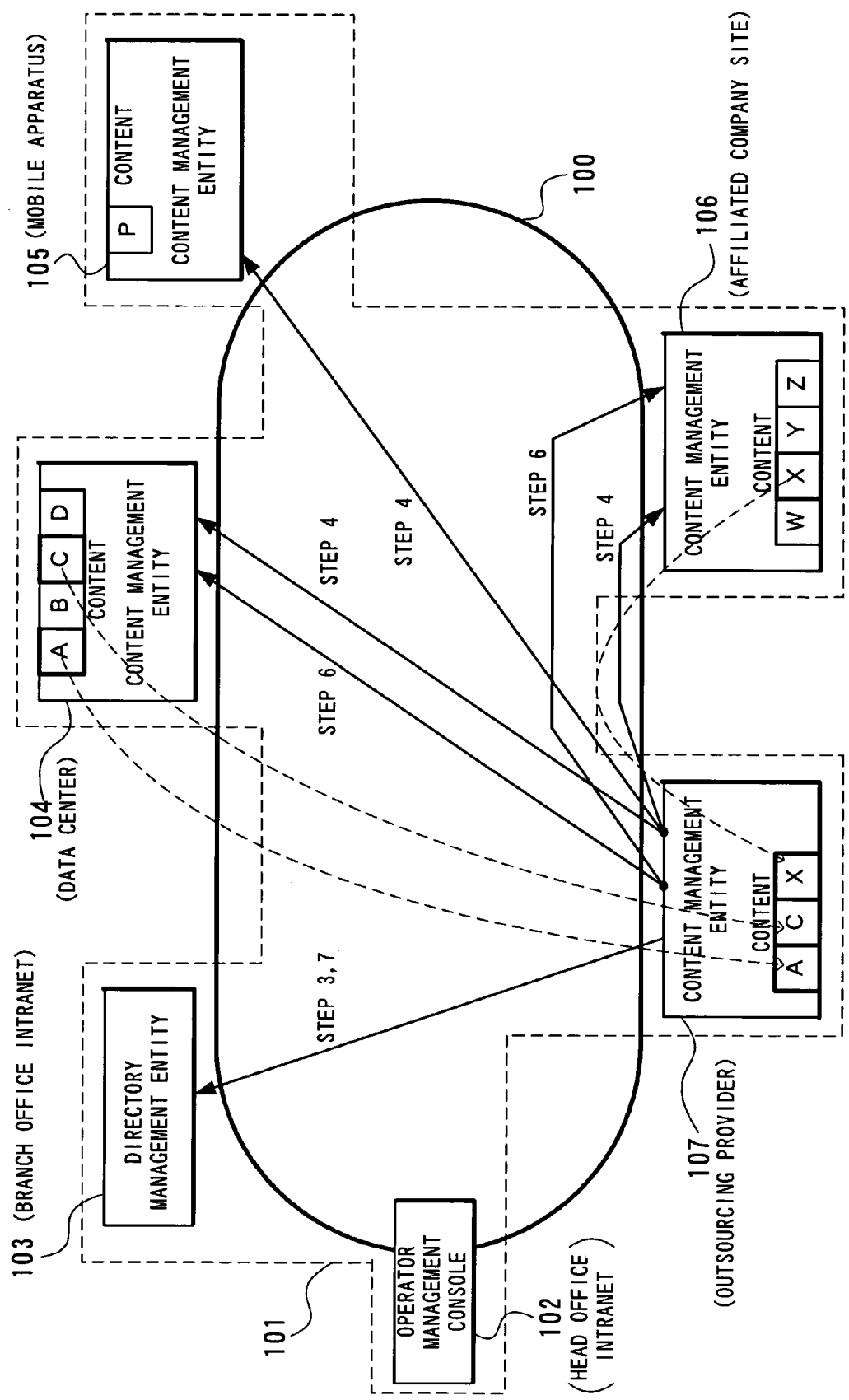
FIG. 10 is a diagram showing an enforcement request made among the management entities in time series, which shows operation of the first embodiment of the present invention.

FIG. 9 is a flow chart showing content of processing by the policy description program distributed from the operator management console 102 to the content management entity 107. The policy description program is a policy description program which makes a copy of content to automatically back up the content in advance and a policy description program which automatizes an updating procedure (updating of the virtual private organization) at the time of scale expansion when the content management entity 107 for backup is newly added to the virtual private organization 101. FIG. 10 shows, in time series, an enforcement request from the content management entity 107 activated by the policy description program to other management entity.

At Step 1, by using the runtimeEntity method of an enforcement environment class, obtain a class corresponding to its own management entity in which the policy description program operates. Obtaining a class corresponding to its own management entity without being premised on its own management entity prevents a policy description program enforcement position from being fixed to a specific management entity. At the time of enforcing the runtimeEntity method at the dynamic conversion unit 506, a local information request is issued to the normalization FI 504. Next, obtain a free disk capacity of its own management entity by using the availableDisk method. When a free capacity is more than 1 Gbyte, execute Step 2 and the following steps.

At Step 2, by using the availableEntities method of the enforcement environment class, search a list of classes corresponding to directory management entity type management entities. Assume that as a result of the search, the directory management entity 103 is found.

At Step 3, by using the listAllIndex method of the directory management entity 103, search a list of classes corresponding to all the content management entities and content names in which the classes are stored. As a result, a list of the content management entities 104, 105 and 106 and their content names is found. At the time of enforcing the listAllIndex method at the enforcement unit 507, a remote enforcement request is issued to the enforcement request IF 503.

At Step 4, by using the getContentAttribute method of the content management entities 104, 105 and 106, obtain, for each content name contained in the search result of Step 3, an attribute value of a frequency of use of the content in question and an attribute value of a capacity.

At Step 5, sort the content in the descending order of attribute values of frequency of use to generate a list of content which can be stored in a free disk capacity of its own management entity according to the order. As a result, the list of the content contains content names A and C of the content management entity 104 and a content name X of the content management entity 106.

At Step 6, by using the readContent method of the content management entities 104 and 106, obtain the content names A, C and X contained in the list of content.

At Step 7, obtain a management entity identifier URI (universal resource identifier) as public information of its own management entity. Next, by using the registerIndex method of the directory management entity 103, register the management entity identifier URI and the content names A, C and X as a list into the directory management entity 103.

Next, detailed description will be made of the entire operation of the present embodiment with reference to FIGS. 7 and 8, the policy description program in FIG. 11, and FIG. 12.

Figure 11:
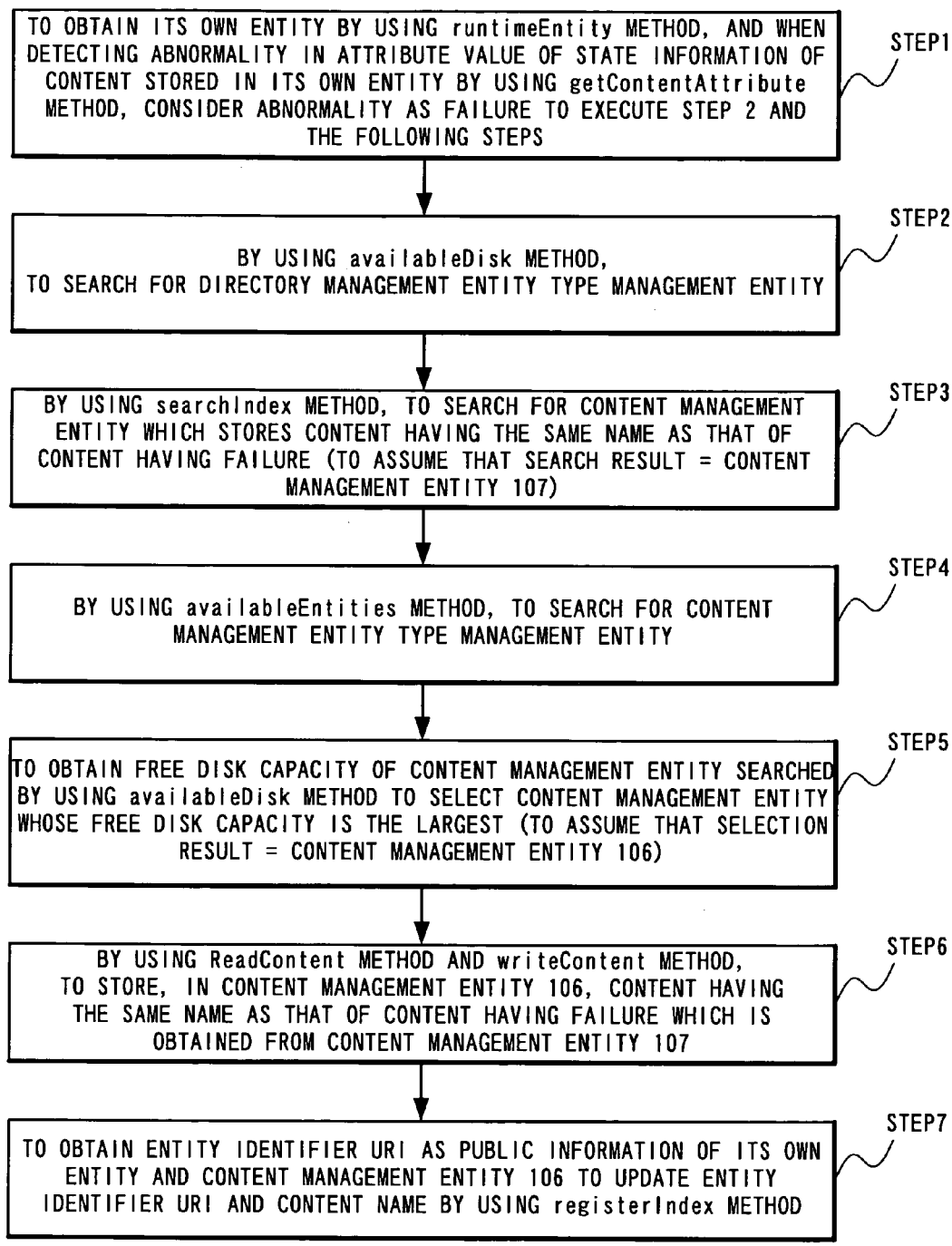
FIG. 11 is a flow chart showing operation content of a policy description program according to the first embodiment of the present invention.
Figure 12:
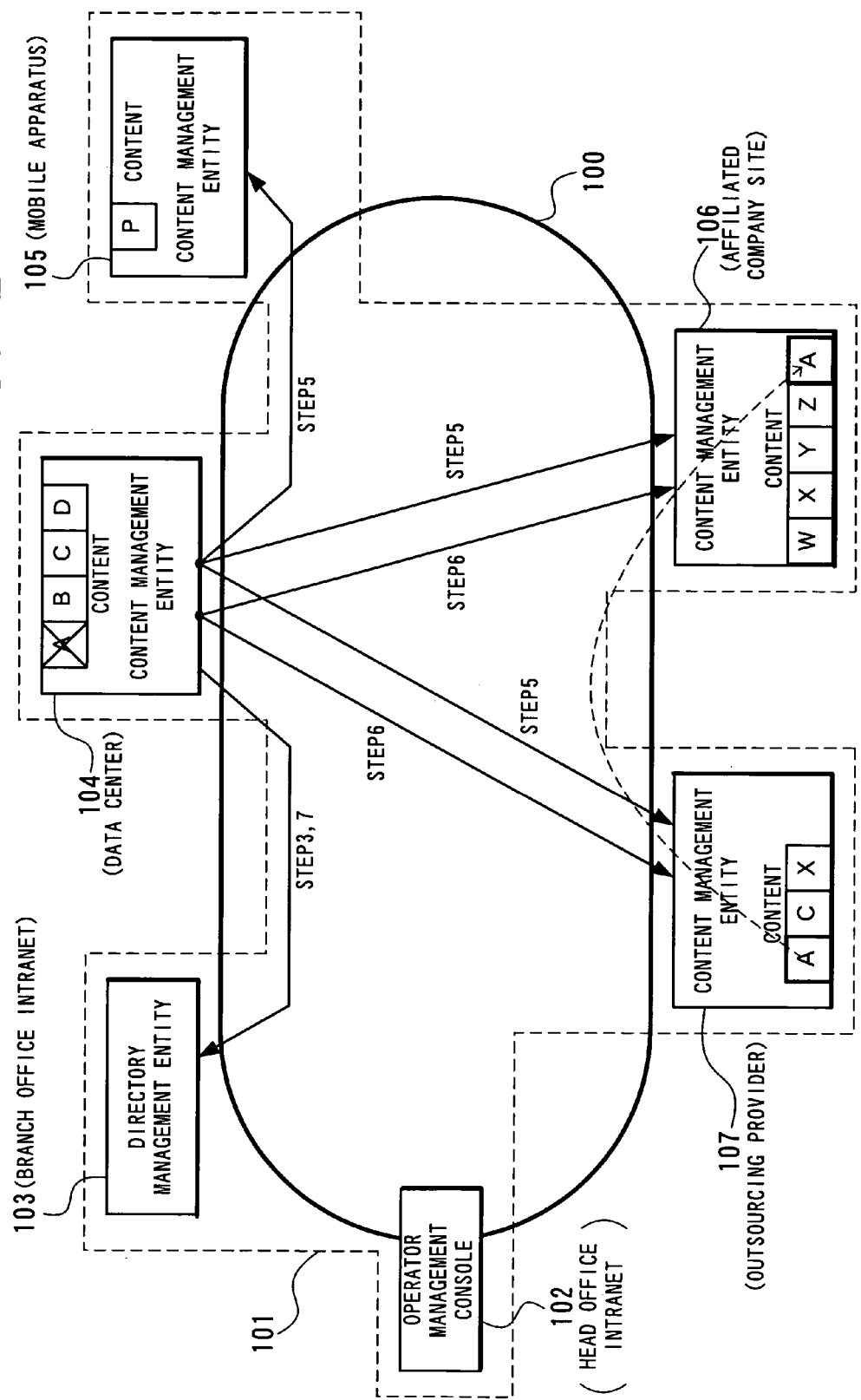
FIG. 12 is a diagram showing an enforcement request made among the management entities in time series, which shows operation of the first embodiment of the present invention.

FIG. 11 is a flow chart showing content of processing by the policy description program distributed from the operator management console 102 to the content management entity 104. The policy description program is a policy description program which makes a copy of content when a failure of the content is detected due to a disk error of the hard disk HW 308 which stores the content data 302 and the frequency of use data 306 to automatically back up the content, thereby automatizing a failure recovery procedure (maintenance of the virtual private organization). FIG. 12 shows, in time series, an enforcement request from the content management entity 104 activated by the policy description program to other management entity.

At Step 1, obtain a list of classes corresponding to its own management entity on which the policy description program operates by using the runtimeEntity method of the enforcement environment class. At the dynamic conversion unit 506, at the time of enforcing the runtimeEntity method, a local information request is issued to the normalization IF 504. Next, by using the getContentAttribute method, obtain state information of content stored in its own management entity. When detecting abnormality in an attribute value of the state information, consider it as a failure to execute Step 2 and the following steps. Assume that the content A having a failure is found as a result.

At Step 2, by using the availableEntities method of the enforcement environment class, search the list of classes corresponding to directory management entity type management entities. Assume that the directory management entity 103 is found as a result.

At Step 3, by using the searchIndex method of the directory management entity 103, search for a content management entity which stores content of the same name as that of the content A. As a result, the content management entity 107 is found. At the enforcement unit, at the time of enforcing the searchIndex method, a remote enforcement request is issued to the enforcement request IF 503.

At Step 4, by using the availableEntities method of the enforcement environment class, search the list of classes corresponding to the content management entity type management entities. As a result, the content management entities 104, 105 and 106 are found.

At Step 5, by using the availableDisk method of the content management entity, obtain a free disk capacity of the searched content management entity to select a content management entity whose free disk capacity is the largest. As a result, the content management entity 106 is selected.

At Step 6, by using the readcontent method and the writeContent method, store the content A obtained from the content management entity 107 into the content management entity 106.

At Step 7, obtain a management entity identifier URI as public information of its own management entity and the content management entity 106 and by using the registerIndex method, update the management entity identifier URI and the content name and register the updates in the directory management entity 103.

Next, effects of the above-described first embodiment will be described.

Since the first embodiment is designed such that by the dynamic conversion unit 506 of the policy enforcement control unit (policy enforcement environment) 300, 400, the policy description program obtains not only its own management entity but also a management entity of other type at the time of enforcement to make an enforcement request for operation or re-structuring to the management entity in question, the policy description program has its enforcement position not fixed to a specific management entity but allows its enforcement to be conducted by the policy enforcement control unit (enforcement environment) of an arbitrary management entity. The need of creating a policy description program specialized for a specific management entity can be eliminated. Since the information request IF 502 and the enforcement request IF 503 of the policy enforcement control unit (policy enforcement environment) 300, 400 enable a policy description program to operate while making an information request and an enforcement request bridging over the group of the management entities at the time of enforcement, it is possible to cope with a change of structure with ease without the need of presuming the number and a kind of management entity groups in advance.

Second Embodiment

Next, detailed description will be made of a second embodiment of the present invention with reference to the drawings.

Figure 13:
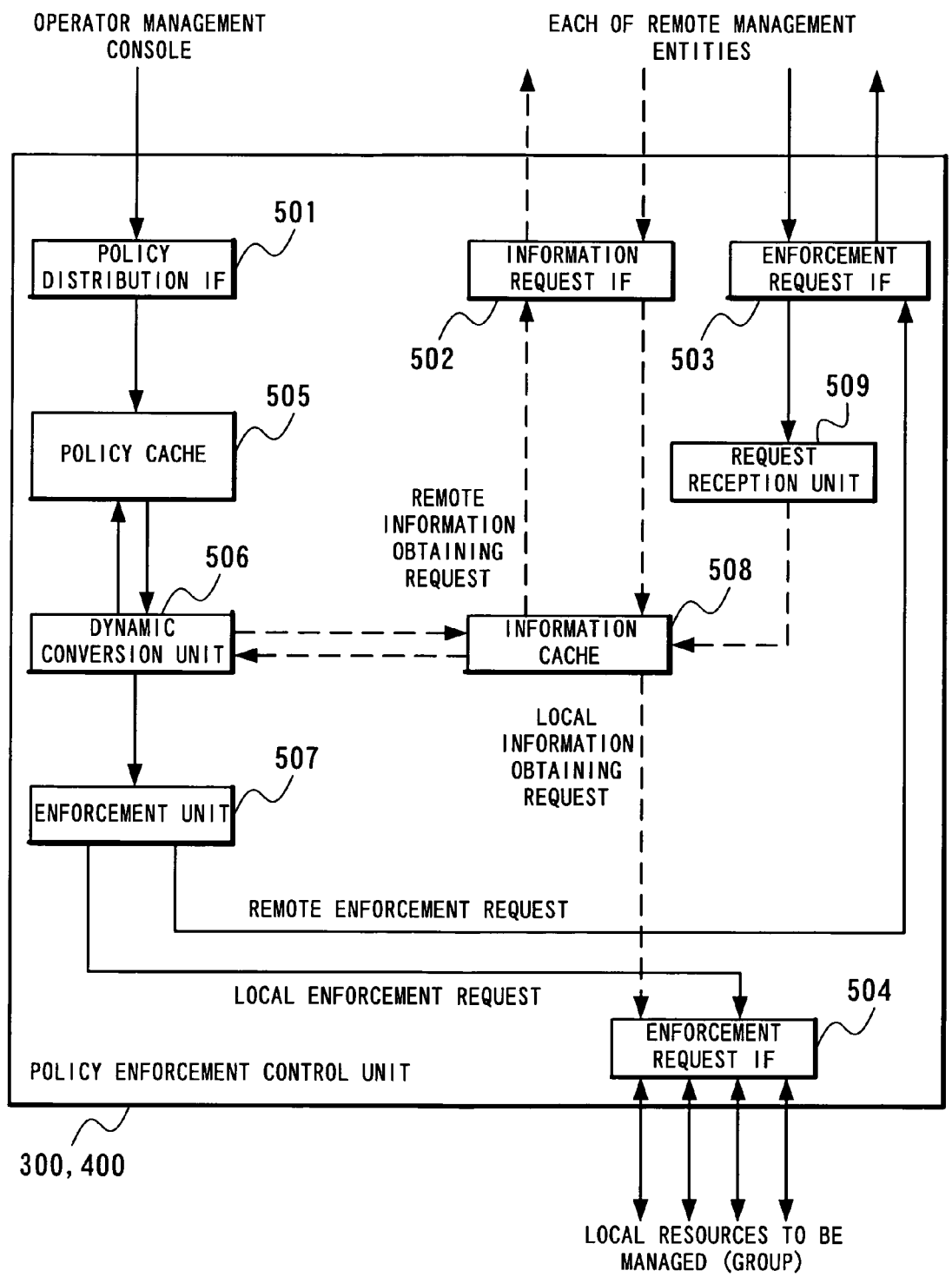
FIG. 13 is a block diagram showing a structure of a policy enforcement control unit of a policy enforcing system according to a second embodiment of the present invention.

With reference to FIG. 13, the policy enforcement control units 300 and 400 according to the second embodiment are structured to have a request reception unit 509 in addition to the components shown in FIG. 6.

These units schematically operate in the following manner. The request reception unit 509 determines whether an enforcement request to its own management entity received from the enforcement request IF 503 exists or not and when the request is an enforcement request for its own management entity, extracts a kind and a parameter of the request and stores them as one kind of form of information required from the information request IF 502 into the information cache 508. This enables the policy description program to use, through the enforcement environment class enforced at he dynamic conversion unit 506, existence/non-existence, a kind or a parameter of the enforcement request received from the enforcement request IF 503. In other words, the policy description program defines and automatizes response behavior such as allowance to an enforcement request to its own management entity or timing adjustment.

Figure 15:
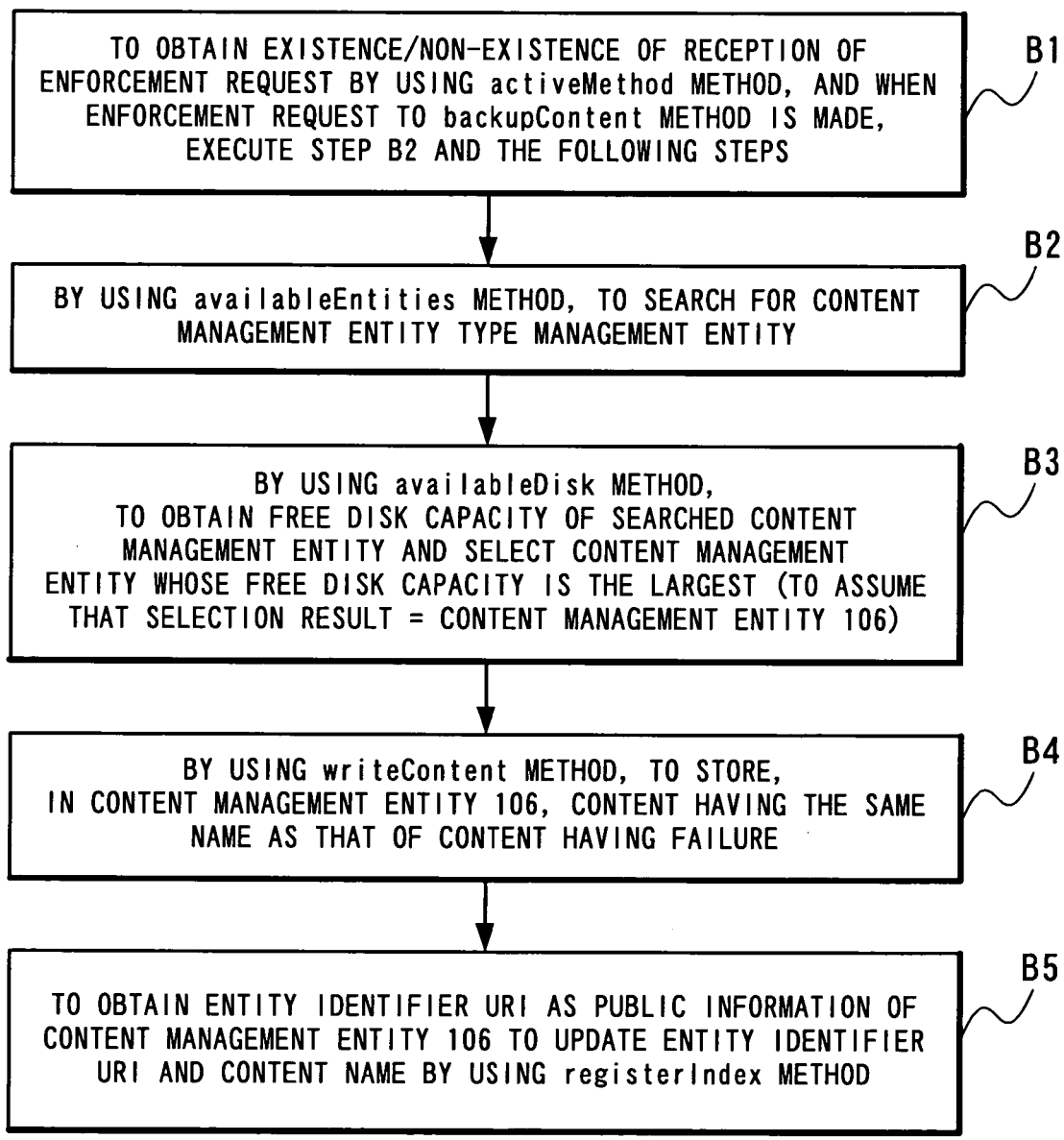
FIG. 15 is a flow chart showing operation content of a policy description program according to the second embodiment of the present invention.
Figure 16:
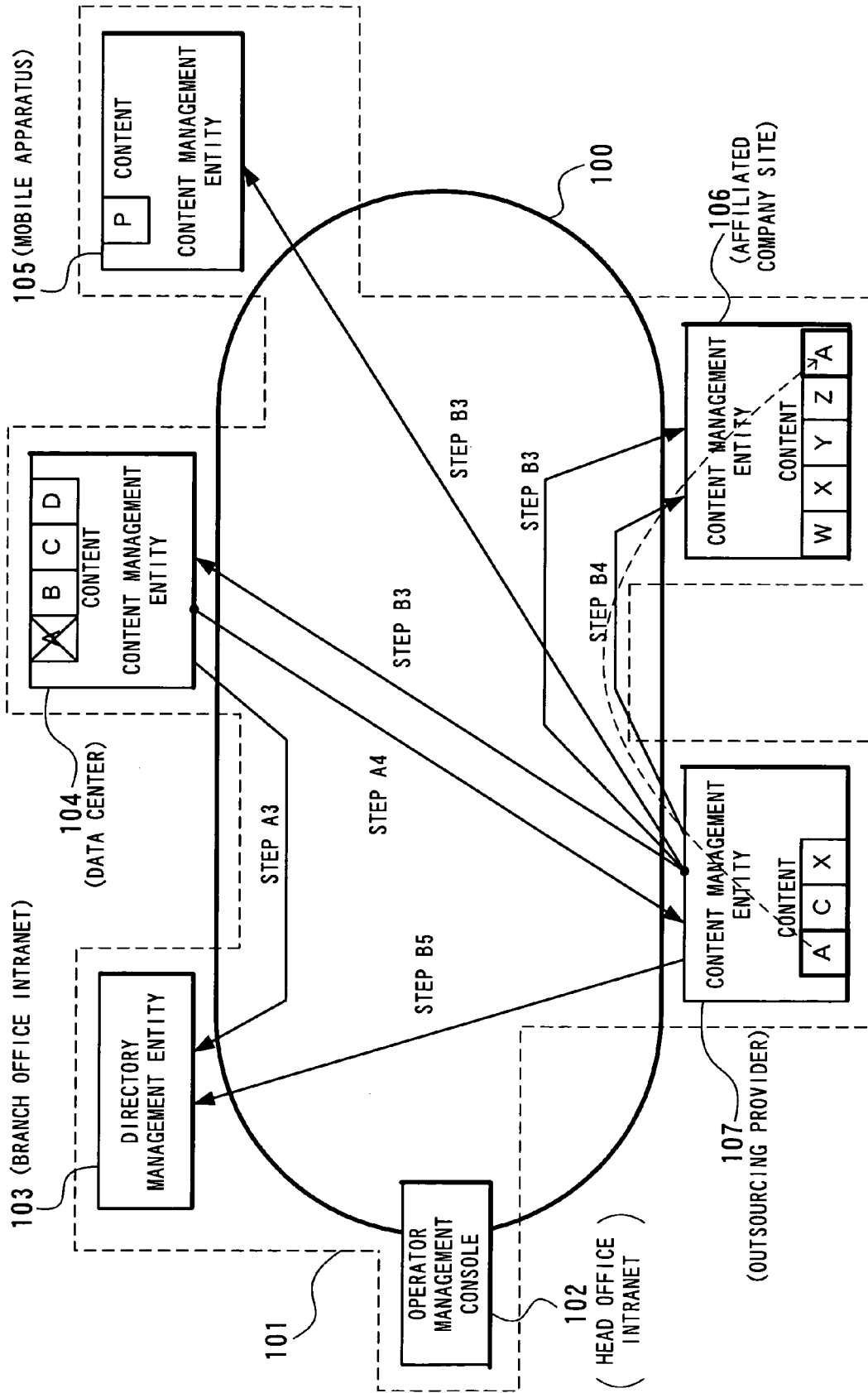
FIG. 16 is a diagram showing an enforcement request made among management entities in time series, which shows operation of the second embodiment of the present invention.
Figure 17:
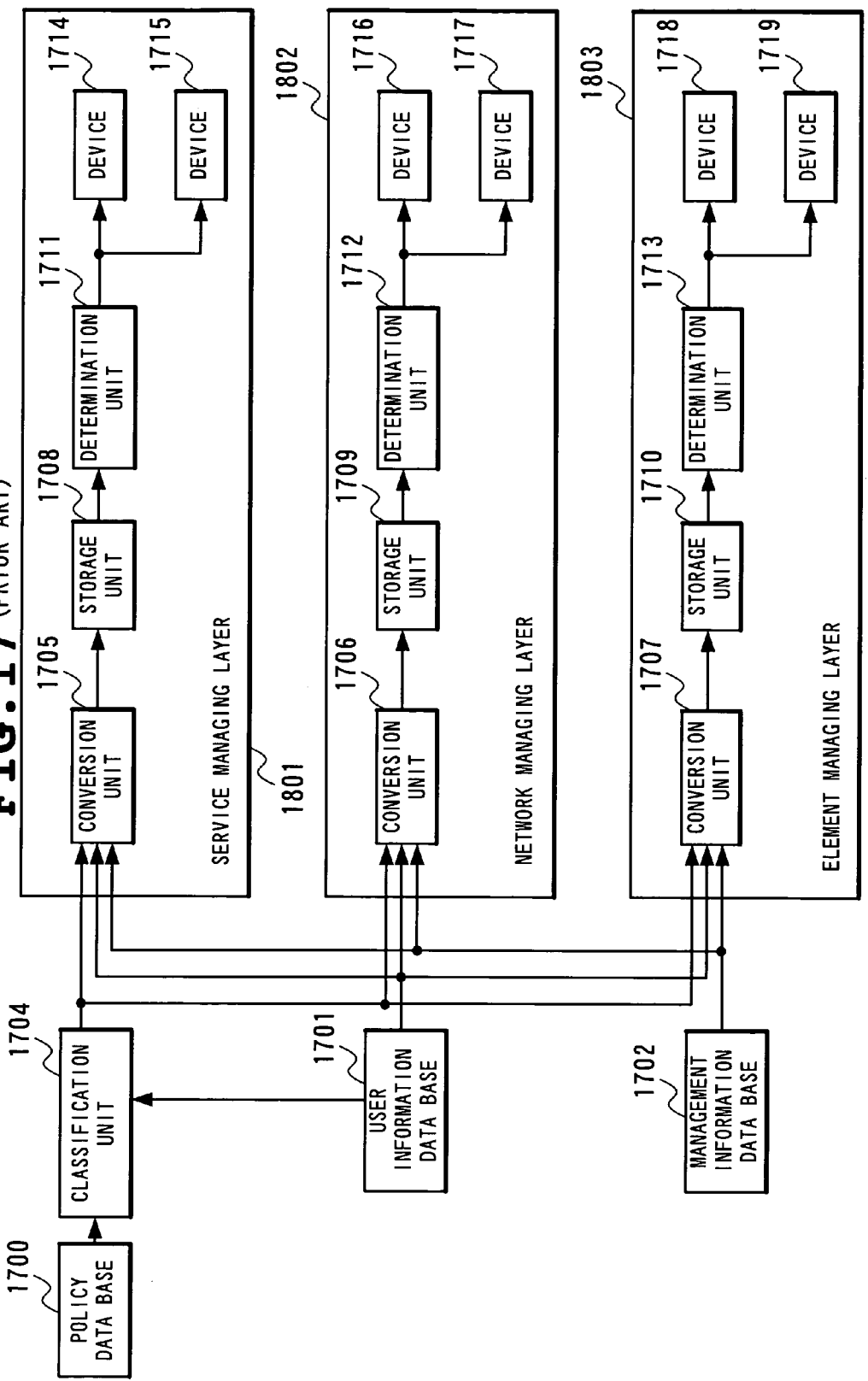
FIG. 17 is a block diagram showing a structure of a conventional system which enforces a policy.

Next, with reference to FIG. 13, the policy description programs shown in FIGS. 14 and 15, and FIG. 16, entire operation of the present embodiment will be described in detail.

Figure 14:
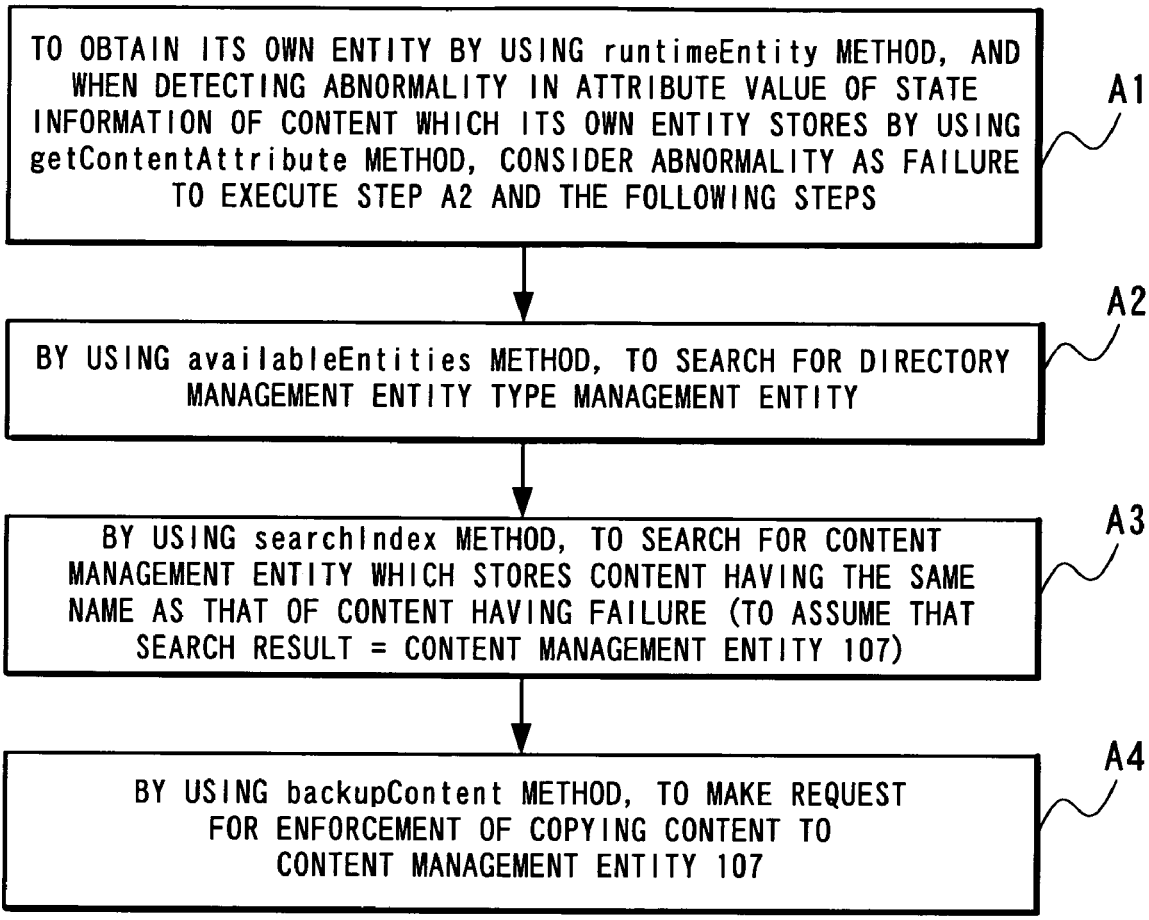
FIG. 14 is a flow chart showing operation content of a policy description program according to the second embodiment of the present invention.

FIG. 14 is a flow chart showing the content of processing by a policy description program distributed to the content management entity 104. FIG. 15 is a flow chart showing the content of processing by a policy description program distributed to the content management entity 107. These policy description programs, similarly to the policy description program shown in FIG. 11, are policy description programs which make a copy of the content to automatically back up the same when a failure is detected in the content due to a disk error or the like, thereby automatizing a failure recovering procedure (maintenance of the virtual private organization). FIG. 16 shows, in time series, an enforcement request from the content management entities 104 and 107 activated by the policy description program to other management entity.

First, the policy description program of the content management entity 104 is enforced. At Step A1, by using the runtimeEntity method of the enforcement environment class, obtain a list of classes corresponding to its own management entity on which the policy description program operates. At the dynamic conversion unit 506, at the time of enforcing the runtimeEntity method, a local information request is issued to the normalization IF 504. Next, by using the getContentAttribute method, obtain state information of content which its own management entity stores. When detecting abnormality in an attribute value of the state information, consider the abnormality as a failure to execute Step A2 and the following steps. Assume that the content A having a failure is found as a result.

At Step A2, by using the availableEntities method of the enforcement environment class, search a list of classes corresponding to the directory management entity type management entity. Assume that the directory management entity 103 is found as a result.

At Step A3, by using the searchIndex method of the directory management entity 103, search for a content management entity which stores content whose name is the same as that of the content A. Assume that the content management entity 107 is found as a result. At the enforcement unit 507, when enforcing the searchIndex method, a remote enforcement request is issued to the enforcement request IF 503.

At Step A4, by using the backupContent method of the content management entity 107, make an enforcement request for copying content to the content management entity 107.

According to the enforcement request, next, enforce the policy enforcement program of the content management entity 107. At the content management entity 107, as to the above-described enforcement request received from the enforcement request IF 503, the request reception unit 509 determines that the request is an enforcement request to its own management entity and extracts a kind and a parameter of the enforcement request to store, in the information cache 508, the obtained request as one form of information requested from the information request IF 502.

At Step B1, by using the activeMethod method of the enforcement environment class, obtain existence/non-existence of reception of an enforcement request and when an enforcement request is made to the backupContent method, enforce Step B2 and the following steps.

At Step B2, by using the availableEntities method of the enforcement environment class, search a list of classes corresponding to the content management entity type management entity. As a result, the content management entities 104, 105 and 106 are found.

At Step B3, by using the availableDisk method of the content management entity, obtain a free disk capacity of a searched content management entity to select a content management entity whose free disk capacity is the largest. As a result, the content management entity 106 is selected.

At Step B4, by using the readcontent method and the writeContent method, store the content A obtained from the content management entity 107 into the content management entity 106.

At Step B5, obtain a management entity identifier URI as public information of its own management entity and the content management entity 106 and by using the registerIndex method, update the management entity identifier URI and the content name and register the same at the directory management entity 103.

Next, effects of the second embodiment will be described.

Being structured to enable communication from the dynamic conversion unit 506 of the policy enforcement control unit (policy enforcement environment) 300, 400 to the dynamic conversion unit 506 of other management entity through the enforcement request IF 503 and the request reception unit 509, the second embodiment allows a policy description program to be divided into a plurality of programs and to be enforced under enforcement environments of a plurality of management entities. As a result, load on the enforcement of a policy description program is distributed to speed up the processing. In addition, since the policy description program is enforced upon an enforcement request at the enforcement request IF 503, behavior of the management entity after the reception of the enforcement request at the enforcement request IF 503 can be programmed to enhance flexibility and expandability.

Although the present invention has been described with respect to the preferred embodiments in the foregoing, the present invention is not necessarily limited to the above-described embodiments. It is clear that various modifications are possible without departing from the gist of the present invention.

The functions of the operator management console 102, the directory management entity 103 and the content management entities 104 to 107 can be realized by providing, for example, a computer, with the above-described functions of the respective units. More specifically, the function may be realized by executing, on a CPU, a program which achieves the respective functions as software.

When realizing the functions of the operator management console 102, the directory management entity 103 and the content management entities 104 to 107 as software, load and execute a program which realizes each function on a program-controllable computer processing unit (CPU). The program is stored in a magnetic disk, a semiconductor memory or other recording medium and loaded from the recording medium into the computer processing device to control operation of the CPU, thereby achieving the function inherent to each unit.

Although the above-described embodiments have been described with respect to maintenance and updating of the virtual private organization as the operation of the policy enforcement system for the virtual private organization, it is apparent that the same description is applicable to all of construction, maintenance, updating and destruction procedures of the virtual private organization.

The policy enforcing system for a virtual private organization according to the present invention achieves the following excellent effects.

First, efficient operation is possible even for a large-scale virtual private organization having a large number of devices. The reason is that because an individual management entity group has a policy description program enforcement environment, load on enforcement environments is distributed to be suitable for increasing a system scale.

Second, it is possible to realize a virtual private organization having excellent flexibility and expandability which is capable of smoothly coping with a change in the number of devices or in a device structure and with addition of a new kind of device or operation. The reason is that the system is designed such that the policy enforcement environment converts a class on a program which appears in a policy description program into a management entity at the time of policy enforcement, so that the device is capable of flexibly coping with a change of the management entity.

Third, it is possible to enforce a high-level policy for a plurality of devices bridging over the respective management layers or devices to be managed (group). The reason is that the system is designed such that an interface of the policy enforcement environment enables a policy description program to make an information request or an enforcement request bridging over a plurality of management entities.

According to the present invention, the system is applicable to such a use as a case where a content provider disposes computers for content distribution at positions geographically close to users and with the entire computer group as a virtual private organization, manages addition of a computer, content data, and content attribute information and use statistics information, or makes business properties inherent to the content provider be reflected on system operation by a replacing policy description program. Moreover, another possible application is, in a multi-national business system covering numerous sites worldwide, with the entire site group forming the corporate business system as a virtual private organization, managing site addition and business data or making inherent business properties be reflected on system operation by a replacing policy description program.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

The invention claimed is:

1. A system which enforces a policy for a virtual private organization formed of a plurality of management entities, each of said plurality of management entities comprising:
   a processor;
   a memory storing software modules, said software modules comprising a policy enforcement environment; and
   resources to be managed, wherein:
      a management console which manages said plurality of management entities distributes a policy description program to each of said plurality of management entities,
      each of said plurality of management entities correlates an access to information of a class in said policy description program with an information request to said resources to be managed or other said management entity, and correlates operation to a class in said policy description program with an enforcement request to said resources to be managed or other said management entity, and
      the classes are classes in an object-oriented program.

2. The policy enforcing system for a virtual private organization as set forth in claim 1, wherein
   said policy enforcement environment of said management entity comprises:
   a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, and a normalization unit which inputs and outputs said information request and said enforcement request in a form native to the resources to be managed which said management entity includes.

3. The policy enforcing system for a virtual private organization as set forth in claim 1, wherein said resources to be managed include computer hardware which stores data for providing application service and enforces computer software.

4. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, and a normalization unit which inputs and outputs said information request and said enforcement request in a form native to the resources to be managed which said management entity includes, wherein said resources to be managed include computer hardware which stores data for providing application service and enforces computer software.

5. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, a normalization unit which inputs and outputs said information request and said enforcement request in a form native to the resources to be managed which said management entity includes, and an information cache unit which stores said input/output information request and enforcement request.

6. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, a normalization unit which inputs and outputs said information request and said enforcement request in a form native to the resources to be managed which said management entity includes, and an information cache unit which stores said input/output information request and enforcement request, wherein said resources to be managed include computer hardware which stores data for providing application service and enforces computer software.

7. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, a normalization unit which inputs and outputs said information request and said enforcement request in a form native to the resources to be managed which said management entity includes, an information cache unit which stores said input/output information request and enforcement request, and a request reception unit which determines whether said enforcement request to the management entity to which the policy enforcement environment belongs exists or not.

8. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, a normalization unit which inputs and outputs said information request and said enforcement request in a form native to the resources to be managed which said management entity includes, an information cache unit which stores said input/output information request and enforcement request, and a request reception unit which determines whether said enforcement request to the management entity to which the policy enforcement environment belongs exists or not, wherein said request reception unit determines whether said enforcement request to the management entity to which the policy enforcement environment belongs exists or not and when there exists an enforcement request to the management entity to which the policy enforcement environment belongs, extracts a kind and a parameter of the request to store, in said information cache unit, the obtained request in one kind of form of an information request from said information request unit.

9. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, and a normalization unit which inputs and outputs said information request and said enforcement request in a form native to the resources to be managed which said management entity includes, wherein said dynamic conversion unit provides the policy description program with an enforcement environment class having a method of searching for a management entity as a class library.

10. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, and a normalization unit which inputs and outputs said information request and said enforcement request in a form native to the resources to be managed which said management entity includes, wherein said dynamic conversion unit provides the policy description program with an enforcement environment class, as a class library, having a method of searching for a management entity in which a policy enforcement environment of the class is included.

11. The policy enforcing system for a virtual private organization as set forth in claim 1, wherein said policy enforcement environment of said management entity comprises:

a dynamic conversion unit which performs said correlation of an access to information of a class in said policy description program with an information request to said resources to be managed or other said management entity, an enforcement unit which performs said correlation of operation to a class in said policy description program with an enforcement request to said resources to be managed or other said management entity, an information request unit which inputs and outputs said information request to/from other said management entities, an enforcement request unit which inputs and outputs said enforcement request to/from other management entities, and a normalization unit which inputs and outputs said information request and said enforcement request in a form native to the resources to be managed which said management entity includes, wherein said dynamic conversion unit provides the policy description program with an enforcement environment class, as a class library, having a method of searching for a method of a class corresponding to an enforcement request received by a management entity in which a policy enforcement environment of the class is included.

12. The policy enforcing system for a virtual private organization as set forth in claim 1, wherein said management console comprises a management information data base which stores static structure information of the system, a user information data base which stores user information of said management entity, and a conversion unit which refers to said management information data base and said user information data base to convert description of said policy description program into a form native to said resources to be managed of said management entity.

13. The policy enforcing system for a virtual private organization as set forth in claim 1, wherein said management entity includes a content management entity which stores content and said virtual private organization manages content.

14. The policy enforcing system for a virtual private organization as set forth in claim 1, wherein said management entity comprises a content management entity which stores content and said virtual private organization manages content, and said management entity comprises a directory management entity which stores, as an index, a name of content which each said content management entity stores.

15. A method of enforcing a policy for a virtual private organization formed of a plurality of management entities, each of said plurality of management entities comprising a policy enforcement environment and resources to be managed, said method comprising:

distributing a policy description program from a management console which manages said plurality of management entities to each of said plurality of management entities, in each of said plurality of management entities, correlating an access to information of a class in said policy description program with an information request to said resources to be managed or other said management entity, and correlating operation to a class in said policy description program with an enforcement request to said resources to be managed or other said management entity, wherein the classes are classes in an object-oriented program.

16. The method of enforcing a policy for a virtual private organization as set forth in claim 15, further comprising:

in said policy enforcement environment of said management entity, a dynamic conversion step that performs said correlation of an access to information of a class in said policy description program with an information request to said resources to be managed or other said management entity, an enforcement step that performs said correlation of operation to a class in said policy description program with an enforcement request to said resources to be managed or other said management entity, a step of inputting and outputting said information request to/from other said management entities, a step of inputting and outputting said enforcement request to/from other management entities, and a step of inputting and outputting said information request and said enforcement request in a form native to the resources to be managed which said management entity includes.

17. The method of enforcing a policy for a virtual private organization as set forth in claim 15, wherein said resources to be managed include computer hardware which stores data for providing application service and enforces computer software.

18. The method of enforcing a policy for a virtual private organization as set forth in claim 15, further comprising:

in said policy enforcement environment of said management entity, a dynamic conversion step that performs said correlation of an access to information of a class in said policy description program with an information request to said resources to be managed or other said management entity, an enforcement step that performs said correlation of operation to a class in said policy description program with an enforcement request to said resources to be managed or other said management entity, a step of inputting and outputting said information request to/from other said management entities, a step of inputting and outputting said enforcement request to/from other management entities, a step of inputting and outputting said information request and said enforcement request in a form native to the resources to be managed which said management entity includes, and a step of storing said input/output information request and enforcement request.

19. The method of enforcing a policy for a virtual private organization as set forth in claim 15, further comprising:

in said policy enforcement environment of said management entity, a dynamic conversion step that performs said correlation of an access to information of a class in said policy description program with an information request to said resources to be managed or other said management entity, an enforcement step that performs said correlation of operation to a class in said policy description program with an enforcement request to said resources to be managed or other said management entity, a step of inputting and outputting said information request to/from other said management entities, a step of inputting and outputting said enforcement request to/from other management entities, a step of inputting and outputting said information request and said enforcement request in a form native to the resources to be managed which said management entity includes, a step of storing said input/output information request and enforcement request, and a step of determining whether said enforcement request to the management entity to which the policy enforcement environment belongs exists or not.

20. The method of enforcing a policy for a virtual private organization as set forth in claim 15, further comprising:

in said policy enforcement environment of said management entity, a dynamic conversion step that performs said correlation of an access to information of a class in said policy description program with an information request to said resources to be managed or other said management entity, an enforcement step that performs said correlation of operation to a class in said policy description program with an enforcement request to said resources to be managed or other said management entity, a step of inputting and outputting said information request to/from other said management entities, a step of inputting and outputting said enforcement request to/from other management entities, a step of inputting and outputting said information request and said enforcement request in a form native to the resources to be managed which said management entity includes, a step of storing said input/output information request and enforcement request, and a step of determining whether said enforcement request to the management entity to which the policy enforcement environment belongs exists or not, and when there exists an enforcement request to the management entity to which the policy enforcement environment belongs, extracting a kind and a parameter of the request to store the obtained request in one kind of form of an information request from said information request unit.

21. The method of enforcing a policy for a virtual private organization as set forth in claim 15, further comprising:

in said policy enforcement environment of said management entity, a dynamic conversion step that performs said correlation of an access to information of a class in said policy description program with an information request to said resources to be managed or other said management entity, an enforcement step that performs said correlation of operation to a class in said policy description program with an enforcement request to said resources to be managed or other said management entity, a step of inputting and outputting said information request to/from other said management entities, a step of inputting and outputting said enforcement request to/from other management entities, and a step of inputting and outputting said information request and said enforcement request in a form native to the resources to be managed which said management entity includes, wherein said dynamic conversion step provides the policy description program with an enforcement environment class having a method of searching for a management entity as a class library.

22. The method of enforcing a policy for a virtual private organization as set forth in claim 15, further comprising:

in said policy enforcement environment of said management entity, a dynamic conversion step that performs said correlation of an access to information of a class in said policy description program with an information request to said resources to be managed or other said management entity, an enforcement step that performs said correlation of operation to a class in said policy description program with an enforcement request to said resources to be managed or other said management entity, a step of inputting/outputting said information request to/form other said management entities, a step of inputting and outputting said enforcement request to/from other management entities, and a step of inputting and outputting said information request and said enforcement request in a form native to the resources to be managed which said management entity includes, wherein said dynamic conversion step provides the policy description program with an enforcement environment class, as a class library, having a method of searching for a management entity in which a policy enforcement environment of the class is included.

23. The method of enforcing a policy for a virtual private organization as set forth in claim 15, further comprising:

in said policy enforcement environment of said management entity, a dynamic conversion step that performs said correlation of an access to information of a class in said policy description program with an information request to said resources to be managed or other said management entity, an enforcement step that performs said correlation of operation to a class in said policy description program with an enforcement request to said resources to be managed or other said management entity, a step of inputting/outputting said information request to/from other said management entities, a step of inputting and outputting said enforcement request to/from other management entities, and a step of inputting and outputting said information request and said enforcement request in a form inherent to the resources to be managed which said management entity includes, wherein said dynamic conversion step provides the policy description program with an enforcement environment class, as a class library, having a method of searching for a method of a class corresponding to an enforcement request received by a management entity in which a policy enforcement environment of the class is included.

24. The method of enforcing a policy for a virtual private organization as set forth in claim 15, further comprising, in said management console, a step of referring to a management information data base which stores static structure information of the system and a user information data base which stores user information of said management entity, and converting description of said policy description program into a form native to said resources to be managed of said management entity.

25. The method of enforcing a policy for a virtual private organization as set forth in claim 15, wherein said management entity is a content management entity which stores content and said virtual private organization manages content.

26. The method of enforcing a policy for a virtual private organization as set forth in claim 15, wherein said management entity includes a content management entity which stores content and said virtual private organization manages content, and said management entity includes a directory management entity which stores, as an index, a name of content which each said content management entity stores.

27. A program which conducts policy enforcement for a virtual private organization formed of a plurality of management entities, each of said plurality of management entities comprising a policy enforcement environment and resources to be managed, said program comprising:

software instructions for enabling a computer to perform predetermined operations; and a tangible computer readable medium bearing said software instructions;

said predetermined operations comprising:

distributing a policy description program from a management console which manages said plurality of management entities to each of said plurality of management entities, correlating an access to information of a class in said policy description program with an information request to said resources to be managed or other said management entity by said management entity, and correlating operation to a class in said policy description program with an enforcement request to said resources to be managed or other said management entity, wherein the classes are classes in an object-oriented program.

28. The program which conducts policy enforcement for a virtual private organization as set forth in claim 27, further comprising, in said policy enforcement environment of said management entity:

a dynamic conversion function that performs said correlation of an access to information of a class in said policy description program with an information request to said resources to be managed or other said management entity, an enforcement function that performs said correlation of operation to a class in said policy description program with an enforcement request to said resources to be managed or other said management entity, a function of inputting and outputting said information request to/from other said management entities, a function of inputting and outputting said enforcement request to/from other management entities, and a function of inputting and outputting said information request and said enforcement request in a form native to the resources to be managed which said management entity includes.

29. The program which conducts policy enforcement for a virtual private organization as set forth in claim 27, wherein said resources to be managed include computer hardware which stores data for providing application service and enforces computer software.

* * * * *